(12) United States Patent
Ohmori et al.

(10) Patent No.: US 6,438,313 B2
(45) Date of Patent: Aug. 20, 2002

(54) EDITED-LIST CREATING APPARATUS, EDITING APPARATUS AND EDITING METHOD

(75) Inventors: Shigeru Ohmori; Makoto Kushizaki; Koji Tsukimori, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/800,318

(22) Filed: Mar. 6, 2001

Related U.S. Application Data

(62) Division of application No. 09/374,555, filed on Aug. 13, 1999, now Pat. No. 6,292,620, which is a continuation of application No. PCT/JP98/05725, filed on Dec. 17, 1998.

(30) Foreign Application Priority Data

Dec. 17, 1997 (JP) ............................................. 9-364511
Dec. 17, 1997 (JP) ............................................. 9-364512
Dec. 17, 1997 (JP) ............................................. 9-364519

(51) Int. Cl.[7] .............................................. H04N 27/00
(52) U.S. Cl. ........................................ 386/55; 386/52
(58) Field of Search ............................ 386/46, 52, 55, 386/65, 125; 345/328

(56) References Cited

U.S. PATENT DOCUMENTS

| | | | |
|---|---|---|---|
| 5,760,767 A | 6/1998 | Shore et al. | 345/328 |
| 5,926,603 A | 7/1999 | Tanaka et al. | 386/52 |
| 6,072,503 A | 6/2000 | Tani et al. | 345/473 |
| 6,134,380 A | 10/2000 | Kushizaki et al. | 386/55 |

FOREIGN PATENT DOCUMENTS

| | | |
|---|---|---|
| JP | 6-295566 | 10/1994 |
| JP | 8-203249 | 8/1996 |
| JP | 9-306148 | 11/1997 |

*Primary Examiner*—Huy Nguyen
(74) *Attorney, Agent, or Firm*—Frommer Lawrence & Haug LLP; William S. Frommer; Darren M. Simon

(57) ABSTRACT

The present invention displays a second mark of the length corresponding to the material length of a specified image/sound material at the corresponding position on the first track in an edited-list creating screen; when a first mark displayed on one of first and second track is specified on the edited-list creating screen, emphatically displays the specified first mark and a first mark displayed on the second or first track corresponding to this in the case where video information and audio information of the video/audio material corresponding to the specified first mark are linked and registered; in obtaining edited image and/or sound, continuously plays back edit material to be played back with the same playback device; in edit-processing a plurality of continuous second edit materials of edit processing period of time is included in a first edit material on the time axis, creates edited data for continuously performing said edit processing on individual second edit materials from the first of second edit material to the last of second edit material.

2 Claims, 16 Drawing Sheets

EDITED-LIST CREATING APPARATUS, EDITING APPARATUS AND EDITING METHOD

This is a division of U.S. patent application Ser. No. 09/374,555, filed Aug. 13, 1999, U.S. Pat. No. 6,292,620, which is a continuation of International Application PCT/JP98/05725 having an international filing date of Dec. 17, 1998.

TECHNICAL FIELD

The present invention relates to an edited-list creating apparatus, an editing apparatus and an editing, method, and is appropriately applied to an edited-list creating apparatus, an editing apparatus and an editing method capable of creating a so-called edited list in which the edit content is defined for obtaining a desired edited image and sound, for example, by linking a plurality of pre-registered image and sound materials (hereinafter, referred to as clips) together in a desired state.

BACKGROUND ART

Formerly, there has been proposed such an editing apparatus capable of displaying a predetermined GUI (Graphical User Interface) screen, in which a user can create the edited list by using the GUI screen.

In practice, the GUI screen displays identify information such as ID number of each clip pre-registered or titles, and in this state, a desired clip can be selected through the manipulation of a mouse.

Moreover, as shown in FIG. 16A, the GUI screen displays first and second tracks 91A and 91C for image, a track 91B for video special-effect, first and second tracks 91D and 91E for sound, along the time axis 90.

On the GUI screen, after a desired clip being selected, a desired position of the track 91A, 91C, 91D or 91E for image or sound is specified through the manipulation of the mouse and thereby, as shown in FIG. 16B, frames 92A to 92D having a length corresponding to the material length of the selected clip are displayed with the specified position as the front end, on the track 91A, 91C, 91D or 91E.

Thus, in such editing apparatus, the aforementioned operation is successively repeated on the GUI screen, and frames 92A to 92D of the desired clips are displayed successively on the first or second track 91A, 91C for image, and the first or second track 91D, 91E for sound so that the frames are continuous with each other on the time axis 90, and thereby an edited list can be created.

However, in such a conventional editing apparatus, if the frame 92A to 92D of the desired clip is displayed on the track 91A, 91C, 91D or 91E, it is hard to previously recognize the length of the frame 92A to 92D. Therefore, since it is difficult to beforehand grasp the relations between the frame 92A to 92D and other frames previously displayed on the track 91A, 91C, 91D or 91E, there was a problem of difficulty in creating an edited list efficiently.

Besides, as such editing apparatus as mentioned above, there have in recent years been those in which the image and the sound of individual clips are linked or unlinked and registered while being linked or unlinked. In the editing apparatus of such a configuration, if the image and the sound of the clips are registered while being linked, the frame 92C or 92D is automatically displayed on the track 91D or 91E for sound corresponding to displaying of the frame 92A or 92B on the track 91A or 91C for image, and if the image and the sound of the clips are registered while being unlinked, the frame 92A to 92D is displayed only on the specified track 91A, 91C, 91D, 91E for image or sound.

Further, in this editing apparatus, when the position of the frame 92A to 92D displayed on the track 91A, 91C, 91D, 91E for image or sound is moved along the time axis 90, moving one frame 92A to 92D displayed on the track 91A, 91C, 91D, 91E for image or sound enables a frame 92A to 92D displayed on the track 91A, 91C, 91D, 91E for image or sound integrally corresponding to the relevant frame to be also moved along the time axis 90, in the case where the image and the sound are linked.

However, in an editing apparatus of such a configuration, when the frame 92A to 92D displayed on the track 91A, 91C, 91D, 91E for image or sound is moved, it is difficult to determine whether the image and the sound of the clip corresponding to the relevant frame are linked or unlinked to be registered. Therefore, there is a problem of difficulty in creating an edited list efficiently.

Further, in the conventional editing apparatus described above, based on the edited list created described above, edited image and sound corresponding to the edited list are produced by controlling a plurality of video tape recorders respectively at predetermined timings to successively play back the corresponding clips and by successively joining these clips together while subjecting them to the special-effect processing if necessary.

Meanwhile, in performing an editing processing of joining two clips together through the special effect processing, such former editing apparatus obtains edited image and sound by allowing one to perform a playback or record processing again after once stopping both the video tape recorder for playback and a video tape recorder for record and accomplishing a cue and rewind operation.

Moreover, the editing apparatus of this type performs a similar operation whenever joining clips together and therefore it has a problem at the time of editing such as joining a plurality of clips together in succession in that so much time is required for the cue and rewind operation of a video tape recorder as not to perform a real time processing, thereby resulting in a significant decrease in the operating efficiency of editing processing.

Moreover, for example, when it is desired to obtain such a special effect as picture-in-picture, the former editing apparatus, in the case where in such a list the edit time of a first clip CL10 and that of a second clip CL11 overlap on the time axis 90 (FIG. 16A) and that of the second clip CL11 is within that of the first clip as shown in FIG. 17A (herein after, referred to as inclusion), is so constructed as to switch the edit processing object from the first clip CL10 to the second clip CL11 and thereafter switch over to the original first clip CL10 again at the stage of completion of edit processing of the second clip CL11.

Consequently, for example, even if an edited list with a plurality of second continuous clips $CL11_A$ to $CL11_D$ to be edit-processed within the edit period of time for the first clip CL10 is made up as shown in FIG. 17B, since the edit processing object is switched from the first clip CL10 to the second clip $CL11_A$ and thereafter it is returned to the original first clip CL10 at the stage of completion of edit processing of the relevant second clip $CL11_A$ as designated with the arrow "a" in FIG. 17C, the editing apparatus of this type has a problem of being incapable of executing such an edit as to switch over from one video to another in the filial screen with the one-time edit at the time of a special effect such as picture-in-picture.

Thus, formerly, to obtain such a special effect, the corresponding edited list is so arranged as to be created after the image for the filial screens of picture-in-picture is previously edited and brought into one material, and there is a problem of difficulty in efficiently performing an edit operation.

DISCLOSURE OF INVENTION

The present invention is made in consideration of the above points and its object is to propose an edited-list creating apparatus, an editing apparatus and an editing method, capable of markedly improving the operating efficiency in the operation of creating an edited list or the editing operation.

To solve these problems, the present invention provides an edited-list creating apparatus for creating an edited list with the edit content defined in such a manner that a first mark of the length conforming to the material length of a specified image/sound material is displayed at a specified position on the first track by specifying desired positions on a first track provided along the time axis after specifying a desired image/sound material out of a plurality of pre-registered image/sound materials, the edited-list creating apparatus comprising first display control means for displaying the first mark at the position specified on the first track; and second display control means for displaying a second mark of the length conforming to the material length of the specified image/sound material at a corresponding position on said first track till the position at which the above first mark is displayed on the above first track.

As a result, according to the present invention, the display position of the first mark can be determined while easily confirming the display situation of the first mark after the determination based on the second mark visually in determining the display position, and thereby an edited-list creating apparatus capable of markedly improving the operating efficiency in the operation of creating an edited list can be realized.

Besides, the present invention provides an edited-list creating apparatus for creating an edited list with the edit content defined in such a manner that a mark of the length conforming to the material length of the specified image/sound material is displayed at a specified position on the first or second track by specifying a desired position on the first or second track for image or sound provided along the time axis after specifying a desired image/sound material out of a plurality of pre-registered image/sound materials, the edited-list creating apparatus comprising display control means for emphatically displaying the specified mark and a mark displayed on the second or first track corresponding to this when the mark displayed on one of the first and second track is specified, in the case where the video information and the audio information of the image/sound material corresponding to the specified mark are linked and registered.

As a result, according to the present invention, it can be easily judged, based on the emphatic display, whether the video information and the audio information of the image/sound material corresponding to the mark are linked or unlinked to be registered. Thus, an edited-list creating apparatus capable of markedly improving the operating efficiency in the operation of creating an edited list can be realized.

Moreover, the present invention provides an editing apparatus comprising control means for controlling a corresponding playback device to successively play back necessary image and/or sound materials continuously until image and/or sound materials to be played back by the same playback device are needed, in obtaining edited image and/or edited sound.

As a result, according to the present invention, edited image and/or edited sound are obtained in a real time by a playback device until the image and/or sound materials to be played back by the same playback device are needed. Thus, editing apparatus capable of markedly improving the operating efficiency in the editing operation can be realized.

Moreover, the present invention provides an editing method comprising a first step of detecting the presence of edit materials to be played back by means of the same playback device based on the edited list; and a second step of successively playback necessary image and/or sound continuously by a corresponding playback device until image and/or sound materials to be played back by the same playback device are needed, based on the detected result and the edited list.

As a result, according to the present invention, edited image and/or edited sound are obtained in a real time by a playback device until the image and/or sound materials to be played back by the same playback device are needed. Thus, an editing method capable of markedly improving the operating efficiency in the editing operation can be realized.

Moreover, the present invention provides an editing apparatus comprising edited-data creation means for creating edited data in such a manner as to continuously perform edit processing on individual second edit materials starting from the primary second edit material to the last second edit material, when performing the edit processing on a plurality of second continuous edit materials with their processing periods of time being included in that of the first edit material on the time axis.

As a result, according to the present invention, the editing operation can be simplified. Thus, an editing apparatus capable of markedly improving the operating efficiency in the editing operation can be realized.

BEST MODE FOR CARRYING OUT THE INVENTION

Figure 1:
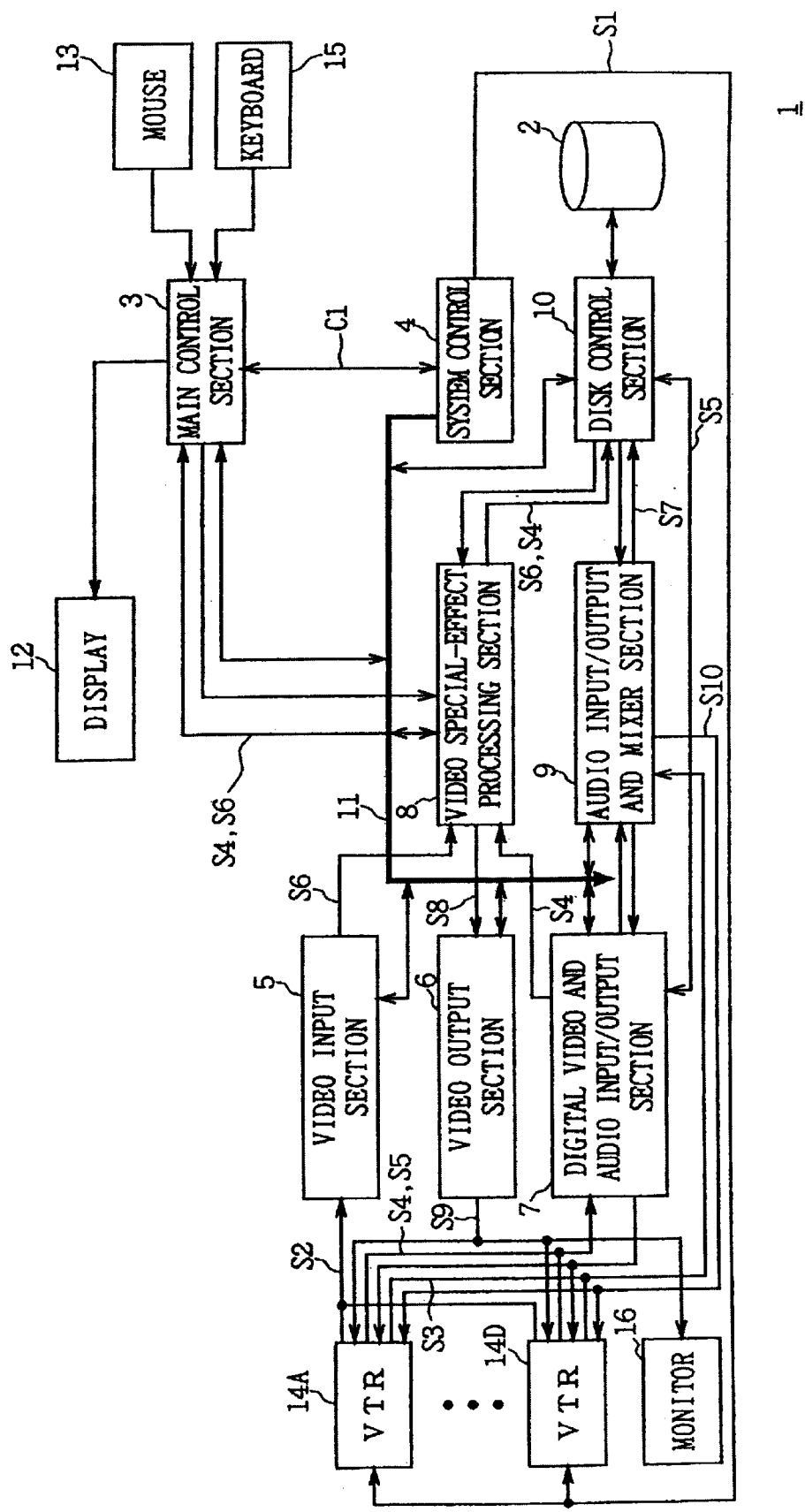
FIG. 1 is a block diagram showing the entire configuration of an editing apparatus according to the present invention.

Hereinafter, one embodiment of the present invention will be described referring to the drawings.

(1) Configuration of an Editing Apparatus According to this Embodiment

In FIG. 1, an editing apparatus according to this embodiment, denoted by 1 as a whole, is arranged so as to register a desired portion of the image and sound recorded on a video tape as a clip and on the other hand to take the video signal and the audio signal of a desired clip into a hard disk drive 2, if necessary.

Besides, this editing apparatus 1 is arranged so as to create an edited list defining the edit content for obtaining a desired edited image and sound by combining individual registered clips together in a desired state, and further actually perform an edit processing in accordance with the edited list created in order to record the obtained edited image and edited sound on a video tape.

Namely, this editing apparatus 1 is comprised of connecting a main control section 3, a system control section 4, a video input section 5, a video output section 6, a digital video and audio input/output section 7, a video special-effect processing section 8, an audio input/output and mixer section 9 and a disk control section 10 through a control bus 11.

In this case, the main control section 3 allows a given operational screen (hereinafter, referred to as a main screen) to be displayed on a display 12 at the initial time. Besides, the main control section 3 selects the clip registration mode by manipulating a mouse 13 under this state and sends a control command C1 to the system control section 4 which corresponds to a playback operation instruction of one video tape recorder out of the video tape recorders 14A to 14D connected to the editing apparatus 1 when this instruction is inputted.

By sending a control signal S1 to the corresponding video tape recorder 14A to 14D in accordance with the control command C1 supplied, the system control section 4 allows the playback operation of the video signal and the audio signal recorded on a video tape to be performed.

As a result, an analog video signal S2 and an analog audio signal S3 as well as a digital video signal S4 and a digital audio signal S5 are outputted from this video tape recorder 14A to 14D, while the analog video signal S2 and analog audio signal S3 are respectively given to the video input section 5 and the audio input/output and mixer section 9, and the digital video signal S4 and the digital audio signal S5 are given to the digital video and audio input/output section 7.

At this time, by controlling either the video input section 5 and the audio input/output and mixer section 9 or the digital video and audio input/output section 7 through the control bus 11, the system control section 4 allows either the analog video signal S2 and the analog audio signal S3 or the digital video signal S4 and the digital audio signal S5 outputted from the video tape recorders 14A to 14D to be taken in.

In this manner, if the analog video signal S2 is taken in via the video input section 5, this is given as a digital video signal S6 to the video special-effect processing section 8 after being digital-converted by the video input section 5, whereas this is given to the video special-effect processing section 8 as it is if the digital video signal S4 is taken in via the digital video and audio input/output section 7.

At this time, under the control of the system control section 4, the video special-effect processing section 8 sends the digital video signal S6 and S4 supplied from the video input section 5 and the digital video and audio input/output section 7 to the main control section 3. Thereby, in the display 12 at this time, an image based on the digital video signal S6 or S4 is displayed at a given position on the main screen.

Besides, at this time, if the analog audio signal S3 is taken in, it is sent from the audio input/output and mixer section 9 to a speaker (not shown) as it is, whereas if the digital audio signal S5 is taken, it is sent to the speaker after being analog-converted by the audio input/output and mixer section 9.

Thereby, with this editing apparatus 1, an operator can specify a desired portion of image and sound based on the image displayed on the display 12 and the sound given from the speaker by using the mouse 13 and a keyboard 15 and can employ this as a clip to register such related data as time code at its in-point and out-point and material length (duration) in the main control section 3.

Besides, at this time, if the take-in mode is selected in advance, the main control section 3 sends the control command C1 corresponding to this to the system control section 4.

By sending a control signal S1 to a corresponding video tape recorder 14A to 14D in accordance with the control command C1 supplied, the system control section 4 allows the image and sound of a specified clip to be played back in the video tape recorder 14A to 14D and on the other hand, allows either the analog video signal S2 and analog audio signal S3 or the digital video signal S4 and digital audio signal S5 outputted from the video tape recorder 14A to 14D to be taken in by controlling either the video input section 5 and audio input/output and mixer section 9 or the digital video and audio input/output section 7 through the control bus 11.

As a result, in the case where the analog video signal S2 is taken in via the video input section 5, it is sent as a digital video signal S6 to the disk control section 10 via the video special-effect processing section 8 after being digital-converted by the video input section 5, whereas in the case where the digital video signal S4 is taken in via the digital video and audio input/output section 7, it is sent to the disk control section 10 as it is.

Besides, at this time, in the case where the analog/digital signal S3 is taken in via the audio input/output and mixer section 9, it is sent as a digital audio signal S7 to the disk control section 10 after being digital-converted by the audio input/output and mixer section 9, whereas in the case where the digital video signal S5 is taken in via the digital video and audio input/output section 7, it is sent directly to the disk control section 10.

And, based on a command given at this time through the control bus 11 from the system control section 4, the disk control section 10 successively takes in the digital video signals S6, S4 given from the video special-effect processing section 8 and the digital video and audio input/output section 7 and the digital audio signals S7, S5 given from the audio input/output and mixer section 9 and the digital video and audio input/output section 7, supplies these to the hard disk drive 2 and allows them to be recorded at specified positions of the hard disk.

In this manner, this editing apparatus 1 is arranged so as to play back a specified image and sound of the clip from the video tape and to take it into the hard disk drive 2.

On the other hand, when clips are registered as mentioned above, the main control section 3 allows the list of registered clips to be displayed on the main screen displayed in the display 12.

And, an operator can make up the edit data as the edited list which defines the edit content such as how to combine each clip with another clip, by using this main screen. Besides, after the completion or in the middle of creation of the edited list, an operator can confirm the edited image and edited sound based on the edited list.

Actually, when the preview mode of the edited image and sound based on the edited list is selected after the completion or in the middle of creation of the edited list, the main control section 3 sends the control command C1 corresponding to this to the system control section 4.

By sending the control signal S1 to a corresponding video tape recorder 14A to 14D based on the supplied control command C1 if necessary, the system control section 4 allow an image and sound of the clip utilized for the edit processing to be played back in the video tape recorder 14A to 14D, whereas it allows the image and sound of the clip utilized for the edit processing to be played back from the hard disk drive 2 by controlling the disk control section 10 through the control bus 11 if necessary.

As a result, the analog video signal S2 and the analog audio signal S3, and the digital video signal S4 and the digital audio signal S5 of a specified clip are outputted from this video tape recorder 14A to 14D. The analog video signal S2 and the analog audio signal S3 are respectively given to the video input section 5 and the audio input/output and mixer section 9, and the digital video signal S4 and the digital audio signal S5 are given to the digital video and audio input/output section 7.

At this time, by controlling either the video input section 5 and the audio input/output and mixer section 9 or the digital video and audio input/output section 7 through the control bus 11, the system control section 4 allows either the analog video signal S2 and the analog audio signal S3 or the digital video signal S4 and the digital audio signal S5 outputted from this video tape recorder 14A to 14D to be taken in.

Thereby, in the case where the analog video signal S2 is taken in via the video input section 5, it is given as the digital video signal S6 to the video special-effect processing section 8 after being digital-converted in the video input section 5, whereas in the case where the digital video signal S4 is taken in via the digital video and audio input/output section 7, it is given to the video special-effect processing section 8 as it is.

At this time, under the control of the system control section 4, the video special-effect processing section 8 performs a special-effect processing on the supplied digital video signals S6, S4 of individual clips so as to be in the specified state according to necessity. Besides, the video special-effect processing section 8 inserts video data such as letters of a title or various graphics given at this time from the main control section 4 according to necessity into the digital video signals S6, S4 of individual clips, or superimposes them onto the digital video signals S6, S4, so as to send an edited video signal S8 obtained thus to the video output section 6.

Under the control of the system control section 4, the video output section 6 analog-converts the supplied digital edited video signal S8, and sends an edited video signal S9 thus obtained to the monitor 16.

On the other hand, at this time, if the analog audio signal S3 out of the analog audio signal S3 and the digital audio signal S5 outputted from the video tape recorder 14A to 14D is taken in via the audio input/output and mixer section 9, it is sent as an edited audio signal to the speaker after being submitted to the edit processing such as mixing in the audio input/output and mixer section 9, whereas if the digital audio signal S5 is taken in via the digital video and audio input/output section 7, it is analog-converted in the audio input/output and mixer section 9, submitted to the edit processing such as mixing and thereafter sent as an edited audio signal to the speaker.

As a result, in this editing apparatus 1, the edited image based on the edited video signal S9 is displayed on the monitor 16 and the edited sound based on the edited audio signal is given from the speaker, thus enabling an operator to confirm the edited image and the edited sound based on the edited list.

Furthermore, after the edited list was created, the main control section 3 sends a corresponding control command C1 to the system control section 4 when its execution instruction is inputted by manipulating the mouse 13 or the keyboard 15.

By sending the control signal Si to a corresponding video tape recorder 14A to 14D based on the supplied control command C1 according to necessity, the system control section 4 allows the image and sound of a clip utilized for the edit processing to be played back in the video tape recorder 14A to 14D, whereas it allows the image and sound of the clip utilized for the edit processing to be played back from the hard disk drive 2 by controlling the disk control section 10 through the control bus 11 according to necessity.

As a result, to the video special-effect processing section 8 as with the above-mentioned preview mode, the digital video signal S6, S4 of the required clip is given from the video tape recorder 14A to 14D via the video input section 5 or the digital video and audio input/output section 7, or the digital video signal S6, S4 of the required clip is given from the hard disk drive 2 via the disk control section 10.

Besides, at this time, to the audio input/output and mixer section 9, the analog audio signal S3 of the required clip is given directly or via the digital video and audio input/output section 7 from the video tape recorders 14A to 14D or the digital audio signals S7, S5 of the required clip is given via the disk control section 10 from the hard disk drive 2.

And, under the control of the system control section 4 as with the preview mode, the video special-effect processing section 8 performs the special-effect processing on the digital video signals S6, S4 of individual supplied clips, sends the digital edited video signal S8 comprising video signals of the edited image thus obtained to the video output section 6.

Under the control of the system control section 4, the video output section 6 analog-converts the supplied digital edited video signal S8 and sends the obtained edited video signal S9 to the corresponding video tape recorder 14A to 14D.

Besides, at this time, under the control of the system control section 4, the audio input/output and mixer section 9 submits the supplied analog audio signal S2 or digital audio signal S5, S7 of individual clips to the edit processing such as mixing if necessary as with the above-mentioned preview mode, and sends the edited audio signal S10 thus obtained to the corresponding video tape recorder 14A to 14D.

In accordance with the control signal S1 given from the system control section 4, the video tape recorder 14A to 14D records the edited video signal S9 supplied from the video output section 6 and the edited audio signal S10 supplied from the audio input/output and mixer section 9 at a specified position of the video tape.

In this manner, the editing apparatus 1 is arranged so as to edit and process the image and sound of a specified clip into the specified state in accordance with the edited list created for registration on the video tape.

(2) Configuration of the Main Control Section

Figure 2:
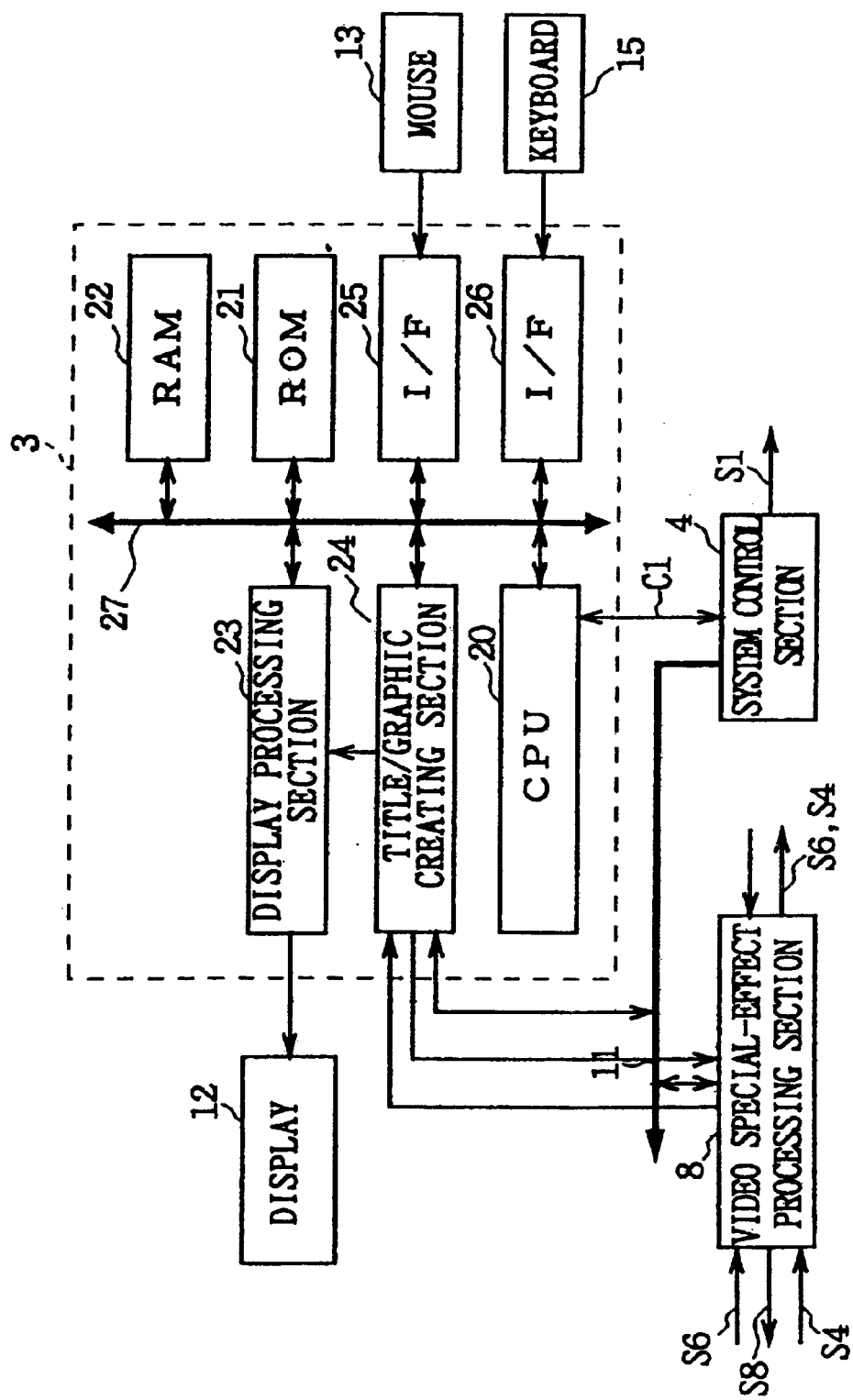
FIG. 2 is a block diagram showing the configuration of a main control section.

Here, as shown in FIG. 2, in the main control section 3, a CPU (central processing unit) 20, a ROM (read only memory) 21, a RAM (random access memory) 22, a display processing section 23, a title/graphic creating section 24 and interface circuits 25 and 26 are connected to each other with a CPU bus 27. And the main control section 3 is connected to a mouse 13 and a keyboard 15 with individual interface circuits 25 and 26.

In this case, by sending the control command C1 to the system control section 4 if necessary in accordance with the program stored in the ROM 21 when the execution instruction of a predetermined processing is given via the interface circuit 25 or 26, for example, by manipulating the mouse 13 or the keyboard 15, the CPU 20 allows the corresponding video tape recorder 14A to 14D, the video input section 5, the video output section 6, the digital video and audio input/output section 7, the video special-effect processing section 8, the audio input/output and mixer section 9 and/or the disk control section 10 to execute a predetermined operation via the system control section 4 and thus allows the editing apparatus 1 as a whole to execute various processing as mentioned above.

Besides, at this time, by reading the video data in the ROM 21 if necessary in accordance with the program stored in the ROM 21 to give them via the display processing section 23 to the display 12, the CPU 20 allows the main screen or various windows as mentioned below to display, and on the other hand, allows a cursor moving in the main screen in response to a mouse manipulation or numerals or letters inputted with the keyboard 15 to be displayed on the display 12, and an image based on the digital video signal S6 or S4 given from the video special-effect processing section 8 via the title/graphic creating section 24 to the display processing section 23 or a static image to be displayed at a predetermined position in the main screen.

Furthermore, the CPU 20 is arranged so as to control the title/graphic creating section 24 if necessary in accordance with the program stored in the ROM 21 in creating video data of letters of titles or graphics and to send them to the video special-effect processing section 8.

(3) Processing of the CPU on a Main Screen

Figure 3:
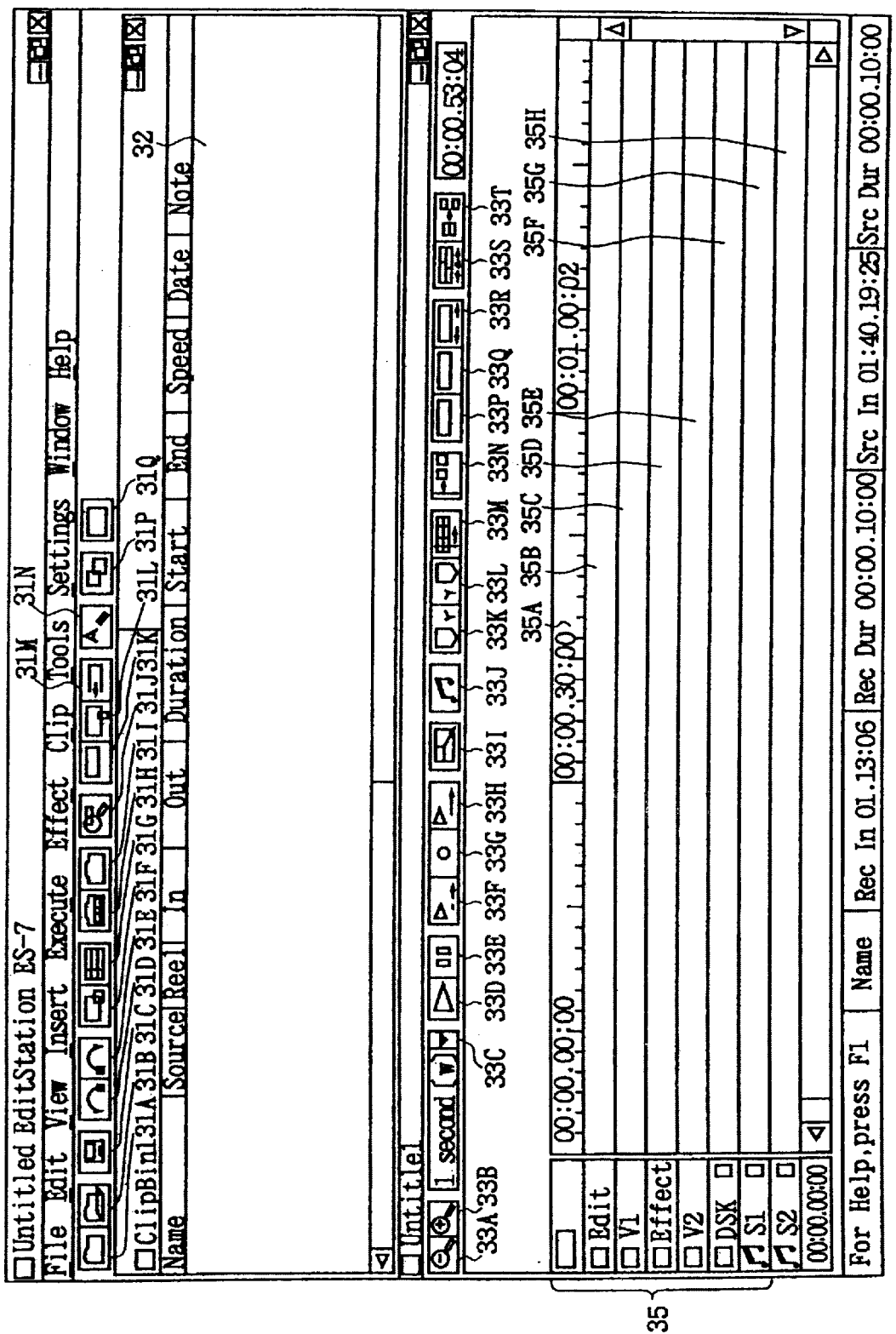
FIG. 3 is a schematic chart showing a main screen.

Here, actually, at the rising time when the power is supplied, the CPU 20 displays a main screen 30 as shown in FIG. 3 on the display 12 in accordance with the program stored in the ROM 21.

This main screen 30 is provided with a plurality of buttons 31A to 31Q for an operator to select a desired processing content, a clip information display part 32 for displaying the list of individual registered clips or the like, a plurality of buttons 33A to 33T for specifying various processing at the time of creating the edited list and an edited-list creating part 35 for creating the edited list.

Figure 4:
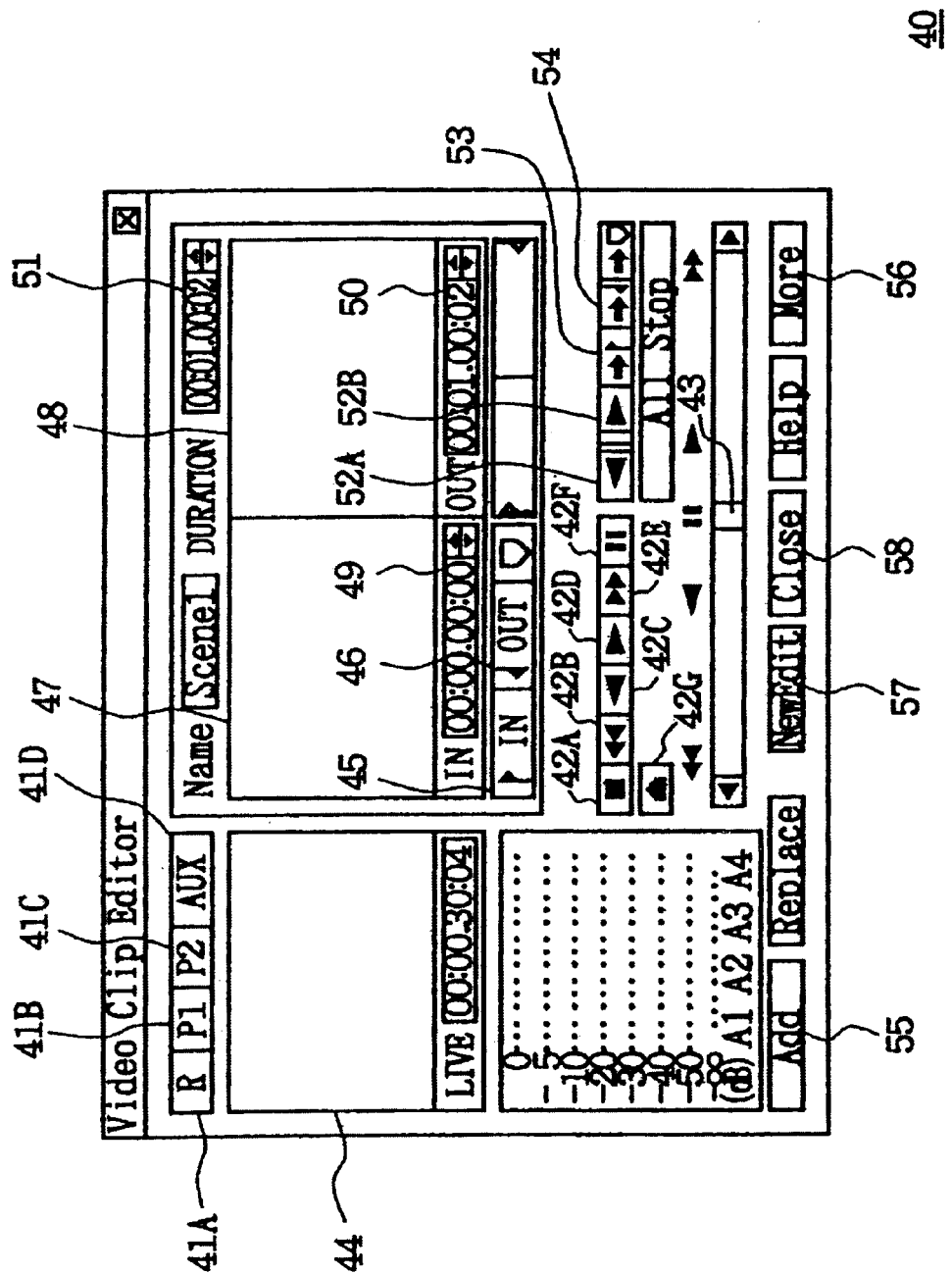
FIG. 4 is a schematic chart showing a video clip edit window.

And, when the video clip edit button 31K at the upper level of the screen is selected by a mouse manipulation on this main screen 30 being displayed on the display 12, the CPU 20 displays a window 40 as shown in FIG. 4 (hereinafter, referred to as a video clip edit window) superimposed on the main screen 30.

In this case, in the video clip edit window 40, a plurality of source select buttons 41A to 41D respectively corresponding to the video tape recorders 14A to 14D are displayed at the top left and a desired video tape recorder 14A to 14D can be selected by selecting any one of these source select buttons 41A to 41D through the mouse manipulation.

And, when any one of video manipulating buttons 42A to 42G displayed in the video clip edit window 40 is selected through the mouse manipulation after any one of the source select buttons 41A to 41D is selected, the CPU 20 allows the relevant video tape recorder 14A to 14D to execute the operation corresponding to the selected video manipulating button 42A to 42G by controlling the corresponding video tape recorder 14A to 14D via the system control section 4.

Incidentally, also on manipulating a slider 43 in the video clip edit window 40, the CPU 20 similarly allows the corresponding video tape recorder 14A to 14D to execute a specified operation.

And at this time, when allowing the video tape recorder 14A to 14D to execute a playback operation or speed change playback operation, the video played back from the video tape by using the relevant video tape recorder 14A to 14D is displayed in a live image display section 44 on this video clip edit window 40.

Thereby, by clicking an in-point specifying button 45 or an out-point specifying button 46 while visually assuring the image displayed in this live image display part 44, an operator can specify the in-point and the out-point of the image part to be registered as a clip. And at this time, the images of a specified in-point and out-point are respectively displayed in an in-point image display part 47 and an out-point display part 48.

Besides, the time codes in the video tapes of individual images specified as the in-point and out-point are respectively displayed on the in-point time code display part 49 and out-point time code part 50, and the material length (duration) of a specified clip is displayed on a duration display part 51.

Incidentally, when a frame-advancing button 52A or 52B in the video clip edit window 40 is selected through the mouse manipulation, the CPU 20 advances images displayed on the live image display section 44 frame by frame in the forward direction or in the backward direction by controlling the corresponding video tape recorder 14A to 14D via the system control section 4. On the other hand, the CPU 20 moves the display image in the live image display section 44 to the in-point or to the out-point by controlling the corresponding video tape recorder 14A to 14D via the system control section 4 when a live image move button 53 or 54 is selected.

And, when a registration button 55 is selected through the mouse manipulation after the in-point and the out-point of a clip are specified as mentioned above, the CPU 20 takes in, as a database, related data such as time code of the in-point and the out-point, material length and recorded position (in a video tape or the hard disk drive 2) of the clip displayed at this time on the display 12 into the RAM 22 and on the other hand, displays the related data such as time code of the in-point and the out-point, material length and registered position of the clip registered thus on the clip information display part 32 of the main screen 30.

Besides, at this time, when the take-in mode is selected in advance on a setup screen (not shown) that can be opened, for example, by selecting a more button 56 of the video clip edit window 40, the CPU 20 controls the corresponding video tape recorder 14A to 14D, the video input section 5 and audio input/output and mixer section 9 or the digital video and audio input/output section 7, the video special-effect processing section 8 and the disk control section 10 via the system control section 4 as mentioned above to make the hard disk drive 2 take in the image and sound of this clip as mentioned above and on the other hand, stores the data, indicating that the recorded position of this clip is in the hard disk drive 2, at the corresponding position in the database (e.g., setup of a flag).

Meanwhile, at this time, the CPU 20 takes in the video signal and the audio signal of this clip into the hard disk drive 2 in excess of predetermined interval (for example, 2 seconds) before and after the specified range (from the in-point to the out-point). Besides, at this time, if the link mode is selected in advance on the above setup screen, for example, by an operator, the CPU 20 takes in the image and sound as data into the hard disk drive 2 after linked and on the other hand, takes in the image and sound as data into the hard disk drive 2 while unlinked if the non-link mode is selected.

And thereafter, when the new edit button 57 is selected through a mouse manipulation, the CPU 20 turns this video clip edit window 40 back to the initial state. Thereby, an operator can successively register other clips hereafter according to a procedure similar to the above one. Besides, when the close button 58 is selected through a mouse manipulation, the CPU 20 closes the relevant video clip edit window 40.

Figure 5:
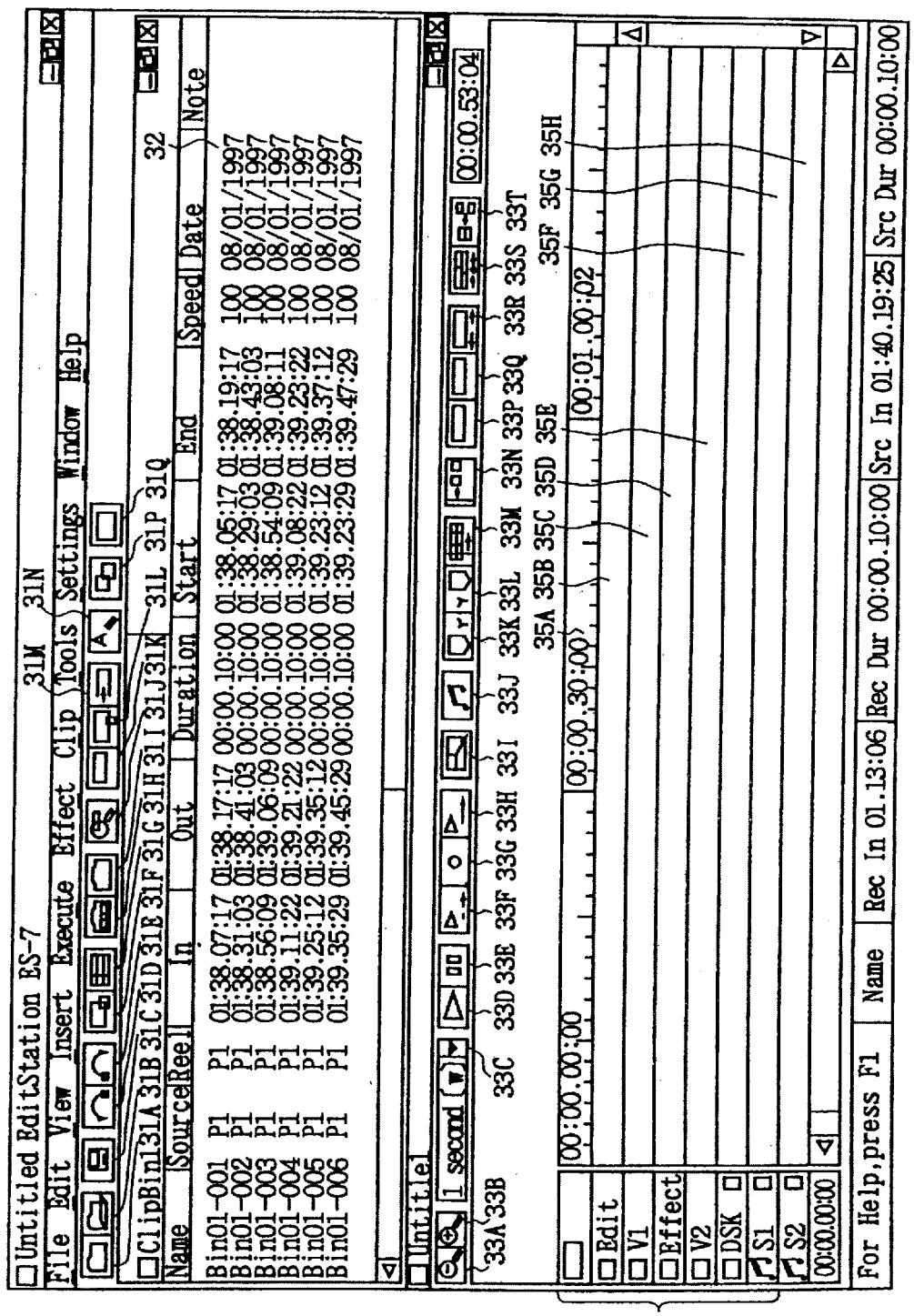
FIG. 5 is a schematic chart showing a main screen.

On the other hand, as described above, an operator can use the edited-list creating part 35 on the main screen 30 with the list of registered clips displayed at the clip information display part 32 on the main screen 30 (FIG. 5) to create an edited list according to the following method.

In this case, first after putting the cursor with a level of the desired clip in the clip information display part 32, one clip is specified by pressing the button of the mouse 13, the cursor is moved to a desired position in the first or second video track 35C or 35E with the time scale 35A of the edited-list creating part 35 employed as the index as it is and thereafter the button of the mouse 13 is released.

Figure 6:
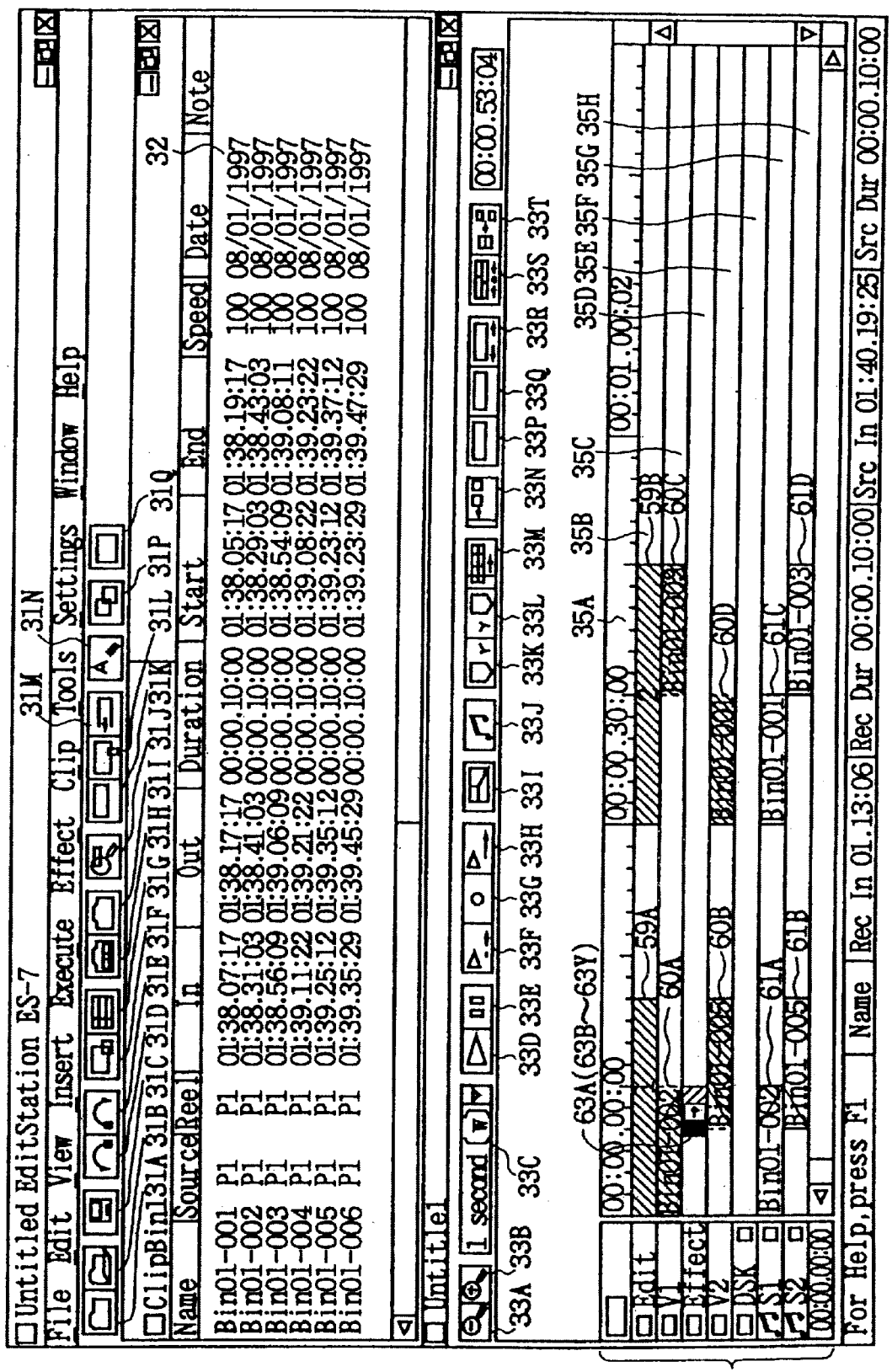
FIG. 6 is a schematic chart showing a main screen.

As a result, in this first or second video track 35C or 35E, the CPU 20 displays frames 60A to 60D of the length corresponding to the material length of the clip specified in the manner mentioned above with the position of the cursor at that time set to their heads as shown in FIG. 6. At this time, in the frame 60A to 60B, identify information such as an ID number of the corresponding clip is displayed.

Besides, at this time. if the image and sound of the clip are registered while linked, the CPU 20 displays the frames 61A to 61D of the same length at the same position on the time scale 35A in the first or second audio track 35G or 35H corresponding to the first or second video track 35C or 35E in which the frames 60A to 60D are displayed as those of the frames 60A to 60D displayed in the first or second video track 35C or 35E.

And an operator repeats manipulations as mentioned above and successively displays the frames 60A to 60D and 61A to 61D in the first and second video tracks 35C and 35E and the first and second audio tracks 35G and 35H so that they continue on the time scale 35A from the beginning of time code ("00:00.00:00") of the time scale 35A to a desired time code (i.e., for a desired period of time). At this time, in the frame 61A to 61D, identify information such as an ID number of the corresponding clip is displayed.

Here, such a display of the frames 60A to 60D and 61A to 61D in the first and second video tracks 35C, 35E and the first and second audio tracks 35G and 35H means that the image of the corresponding clip is displayed or its sound is given on the time represented by the time scale 35A at the output time of edit image and sound in the frames 60A to 60D and 61A to 61D. Accordingly, through such a manipulation, an edited list composed by successively defining clip images or clip sounds displayed as edited images or given as edited sounds can be created.

Incidentally, in creating an edited list like this, when it is desired to apply a special-effect processing at the time of switch over, e.g., from the image of a first clip to that of a second clip, a first frame 60A to 60D corresponding to the first preceding clip is displayed in one of first and second video track 35C and 35E, and a second frame 60A to 60D corresponding to the second succeeding clip is displayed in the other of second and first video track 35E and 35C so that part of the back side of the first frame 60A to 60D is overlapped on part of its front side on the time code of the time scale 35A.

Figure 7:
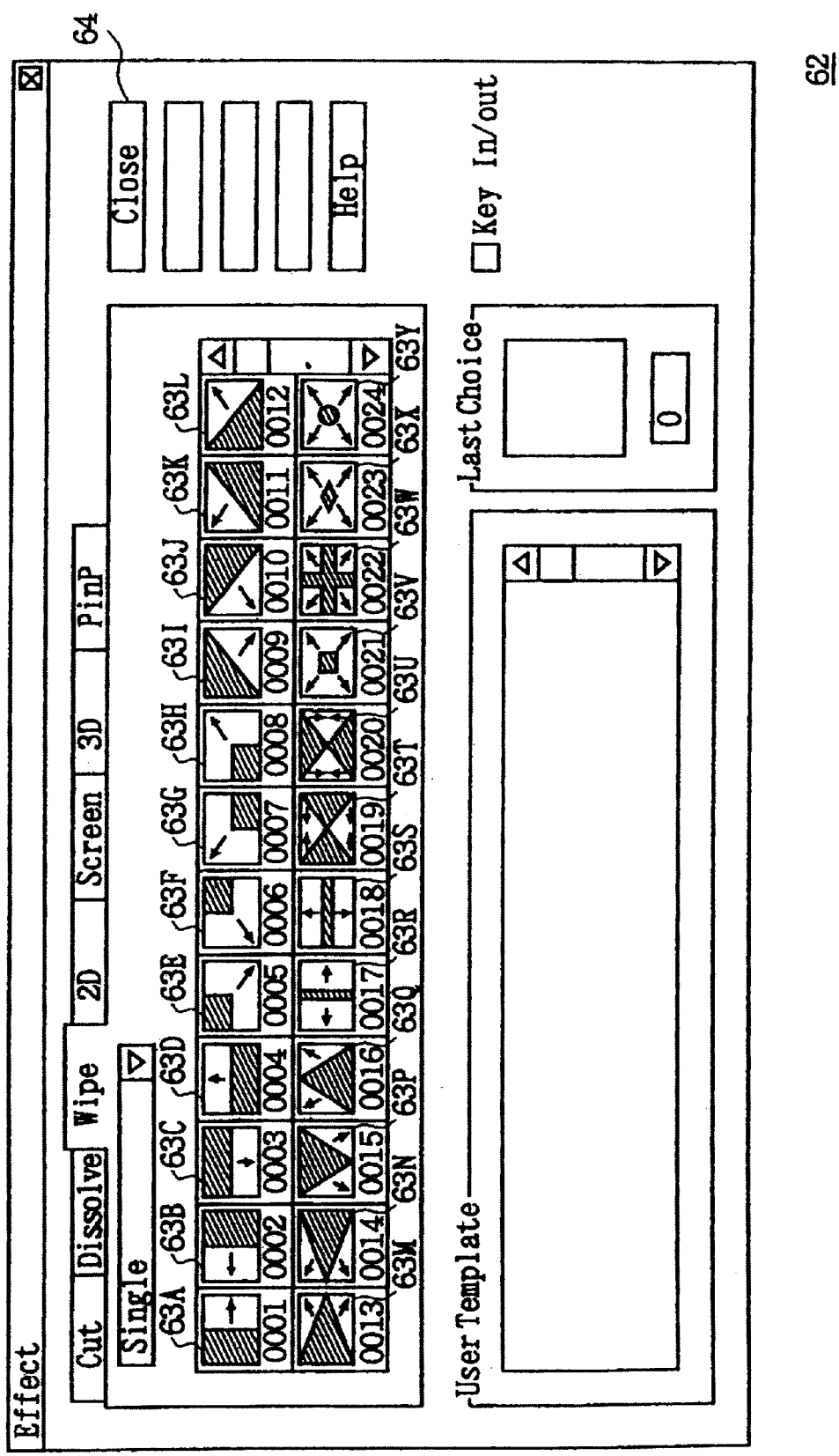
FIG. 7 is a schematic chart showing a select effect window.

Subsequently, the select effect button 33R at the middle of the screen is clicked through a mouse manipulation. As a result, the CPU 20 displays on the main screen 30 a predetermined window (hereinafter, referred to as a select effect window) 62 with a plurality of icons 63A to 63Y indicating the content of various executable special-effect processing, for example, as in FIG. 7.

Next, after moving the cursor onto the icon 63A to 63Y of a desired special-effect processing, the button of the mouse 13 is pressed, the cursor is moved under this condition to the portion where the time codes of the first frame 60A to 60D displayed at one of first and second video track 35C and 35E in the effect track 35D of the above edited list and the second frame 60A to 60D displayed at the other of second and first video track 35E and 35C are overlapped one to another on the time scale 35A, and the button of the mouse 13 is released.

As a result, the CPU 20 moves the icon 63A to 63Y displayed in the select effect window 62 together with the cursor on the screen and moreover, displays the relevant icon 63A to 63Y in a pasted state at the position where the button of the mouse 13 is released.

Thereby, a direction can be inputted that a special-effect processing corresponding to the icon 63A to 63Y pasted in the manner mentioned above in the connection part between the image of the clip corresponding to the first frame 60A to 60D displayed at one of first and second video track 35C and 35E and that of the clip corresponding to the second frame 60A to 60D displayed at the other of second and first video track 35E and 35C should be executed. Incidentally, the select effect window 62 can be closed by selecting a close button 64 through a mouse manipulation.

Furthermore, when the preview button 33D displayed at the middle of the main screen 30 is selected through a mouse manipulation like this after the completion or in the middle of creating an edited list, the CPU 20 displays the edited image based on this edited list on the monitor 16 and outputs the edited sound based on this edited list from the speaker as output means by controlling the corresponding video tape recorder 14A to 14D, the video input section 5, the video output section 6, the digital video and audio input/output section 7, the video special-effect processing section 8, the audio input/output and mixer section 9 and/or the disk control section 10 via the system control section 4 according to necessity as mentioned above.

Still further, when the registration button 33G displayed at the middle of the main screen 30 is selected after an edited list is created in the manner mentioned above, the CPU 20 executes an edit processing based on the edited list by controlling the corresponding video tape recorder 14A to 14D, the video input section 5, the video output section 6, the digital video and audio input/output section 7, the video special-effect processing section 8, the audio input/output and mixer section 9 and/or the disk control section 10 according to necessity via the system control section 4 as mentioned above and records the edited image and the edited sound obtained thus via the video tape recorder 14A to 14D specified in advance by an operator.

(4) Framing Processing and Highlighting Processing

Figure 8:
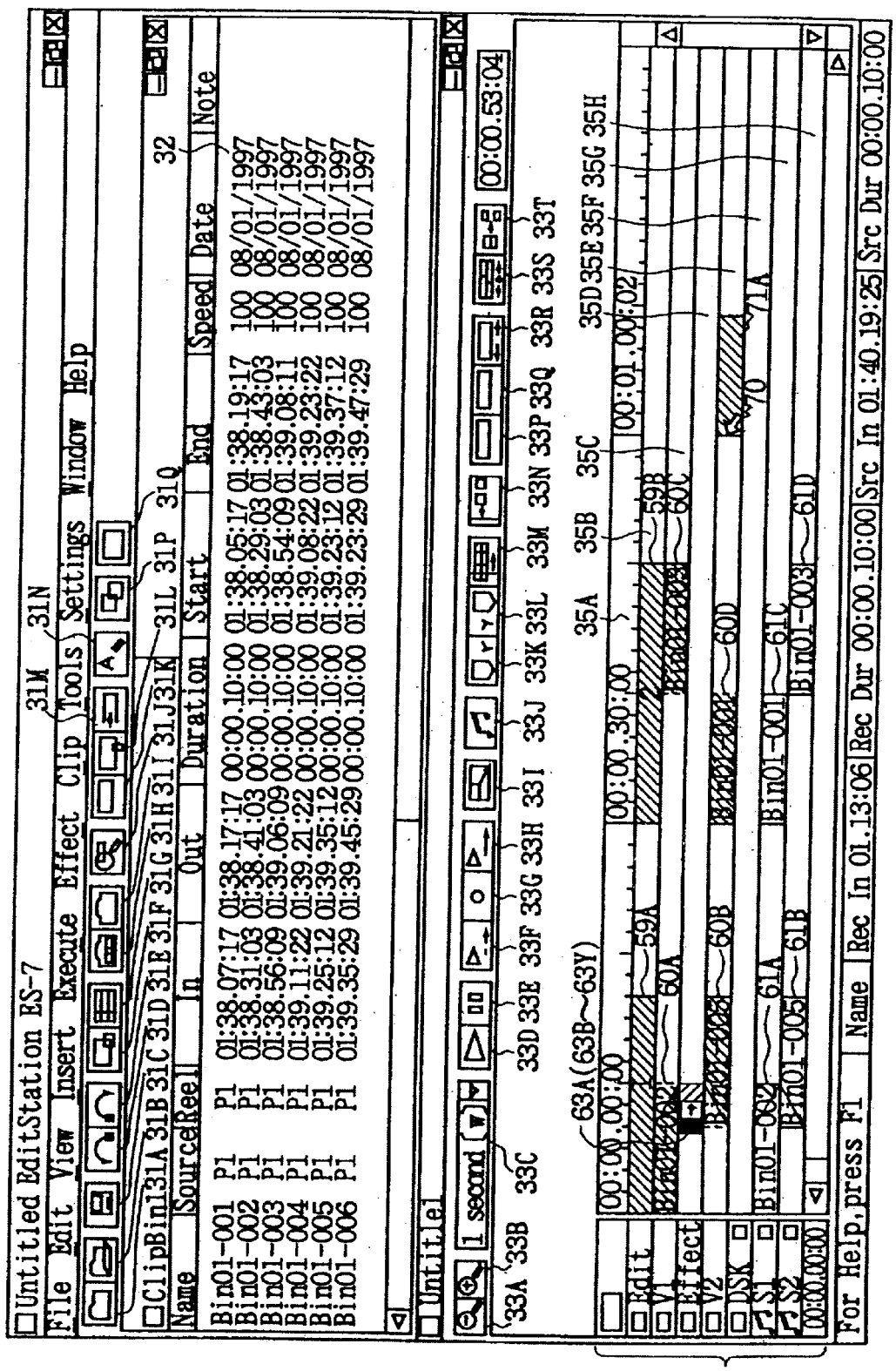
FIG. 8 is a schematic chart showing the appearance of a shadow on the main screen.

Addition to such a configuration, with this editing apparatus 1, when one clip is specified by pressing the button of the mouse 13 and the cursor is moved as it is to a desired position on a first or second video track 35C or 35E or a first or second audio track 35G or 35H of the edited-list creating part 35 after conforming the cursor to a desired clip level in the clip list display part 32 of the main screen 30 through a mouse manipulation in the middle of creating an edited list, the CPU 20 displays a shadow 71A of the length corresponding to the material length of the corresponding clip on the corresponding first or second video track 35C or 35E or first or second audio track 35G or 35H with the position of the cursor 70 at this time as its head as shown in FIG. 8.

And, when the button of the mouse 13 is released in this state, the CPU 20 displays the frame 60A to 60D or 61A to 61D in place of the shadow 71A on the first or second video track 35C or 35E or first or second audio track 35G or 35H as mentioned above.

Thereby, this editing apparatus 1 is so arranged that in the middle of creating an edited list, an operator can create an edited list while visually assuring the position and length of the shadow 71A corresponding to a specified clip by using the edited-list creating part 35 of the main screen 30.

Figure 9:
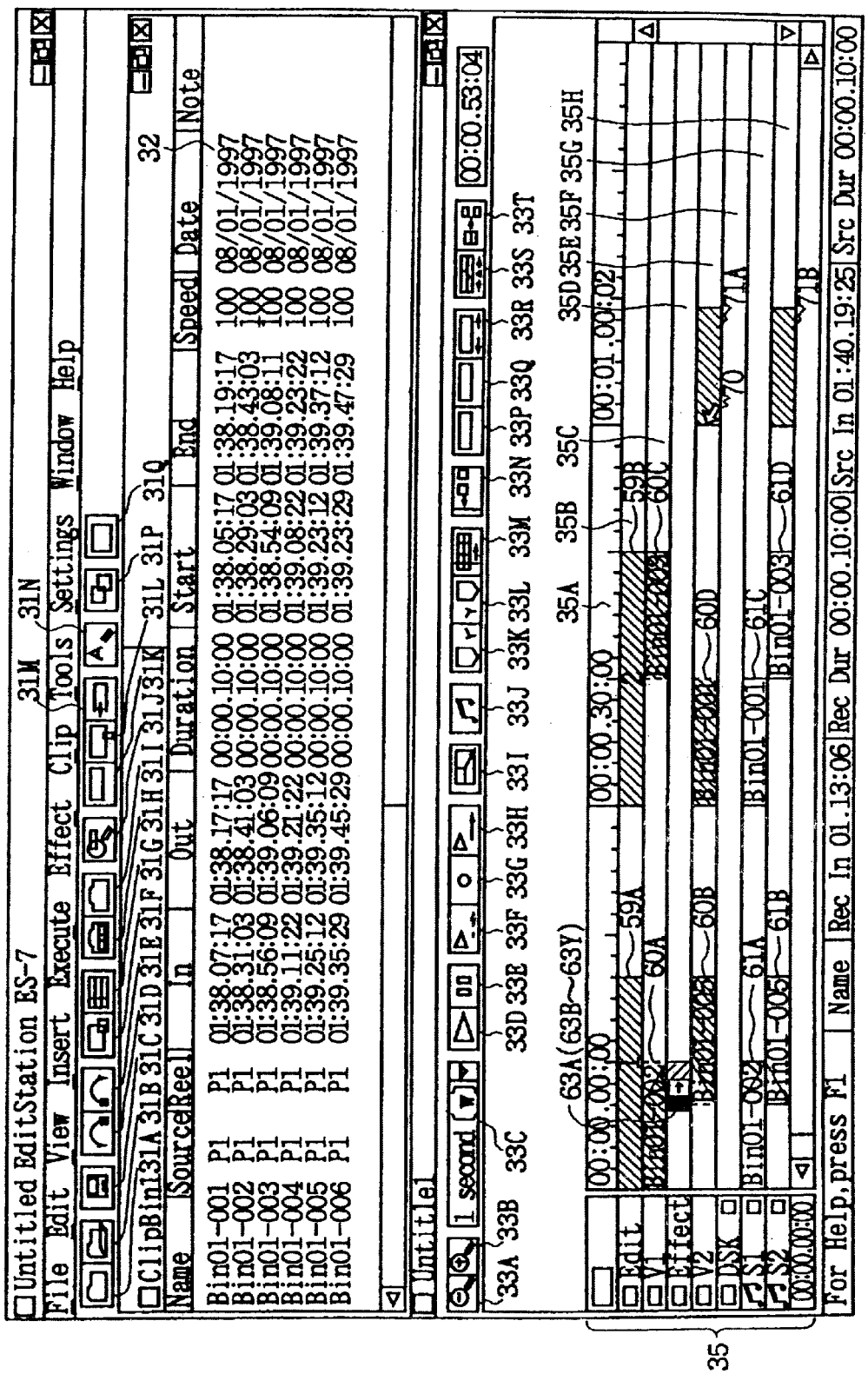
FIG. 9 is a schematic chart showing the appearance of a shadow on the main screen.

Besides, if the video information and audio information of the relevant clip is unlinked and registered, for example, in displaying the shadow 71A on a first or second video track 35C or 35E or first or second audio track 35G or 35H, the CPU 20 displays the shadow 71A only on a first or second video track 35C or 35E or first or second audio track 35G or 35H specified by the cursor 70 as shown in FIG. 8, whereas if the video information and the audio information of the clip are linked and registered, as shown in FIG. 9, it displays the shadows 71A and 71B on one of first and second video track 35C and 35E and first and second audio track 35G and 35H specified by the cursor 70 and on the corresponding other of first and second audio track 35G and 35H and first and second video track 35C and 35E, respectively.

Thereby, this editing apparatus 1 is so arranged that in the middle of creating an edited list, an operator can easily assure visually on the basis of the shadows 71A and 71B displayed at a first or second video track 35C or 35E or information and audio information of a specified clip are registered with linked or unlinked, and thus can easily create an edited list.

On the other hand, by selecting a dedicated command from a predetermined drop down menu to input a numerical value after specifying the relevant frame 60A to 60D, 61A to 61D by conforming the cursor 70 to a desired frame 60A to 60D, 61A to 61D from individual frames 60A to 60D and 61A to 61D displayed on the first and second video tracks 35C and 35E and first and second audio tracks 35G and 35H and clicking the mouse 13, this editing apparatus 1 can move the position of the relevant frame 60A to 60D, 61A to 61D on the same first or second video track 35C or 35E or first or second audio track 35G or 35H.

Thereby, an operator can move individual frames 60A to 60D and 61A to 61D displayed on the first and second video tracks 35C and 35E and first and second audio tracks 35G and 35H to desired positions if necessary.

Besides, at this time, if the video information and audio information of the clip corresponding to the relevant frames 60A to 60D and 61A to 61D are linked and registered, the frame 61A to 61D or 60A to 60D displayed at the other of first and second audio tracks 35G and 35H and first and second video tracks 35C and 35E corresponding can be moved together with the frame 60A to 60D or 61A to 61D displayed at one of first and second video tracks 35C and 35E and first and second audio track 35G and 35H.

And, in this case, if the image and sound of the clip corresponding to the frames 60A to 60D and 61A to 61D specified through the mouse manipulation are unlinked and registered, the CPU 20 highlight-displays only the inside of the frames 60A to 60D and 61A to 61D. on the other hand, the CPU 20 highlight-displays the inside of the frames 60A to 60D and 61A to 61D and the inside of the frames 60A to 60D and 61A to 61D displayed at the first or second video track 35C or 35E or first or second audio track 35G or 35H corresponding to this, if the video information and audio information of the clip corresponding to the relevant frames 60A to 60D and 61A to 61D are linked and registered.

Thereby, this editing apparatus 1 is arranged so as to easily judge on the basis of highlighting when the frames 60A to 60D and 61A to 61D are specified at the time of creating an edited list whether the video information and audio information of the clip corresponding to the relevant frames 60A to 60D and 61A to 61D are linked or unlinked, and registered.

Figure 10:
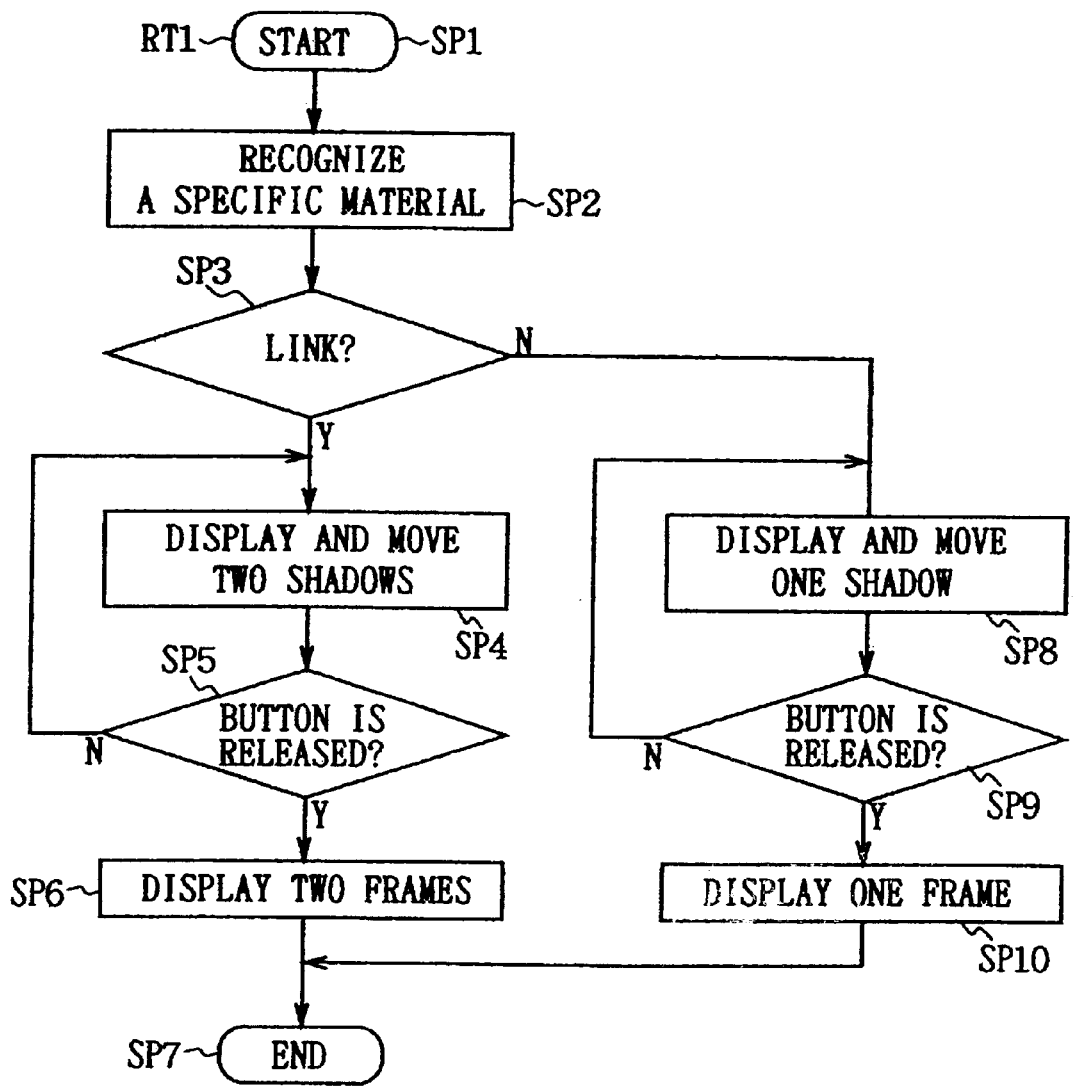
FIG. 10 is a flow chart showing the framing procedure.

Here, actually, at the time of creating an edited list, the CPU 20 displays the frames 60A to 60D and 61A to 61D on the first and second video tracks 35C and 35E or the first and second audio track 35G and 35H of the main screen 30 in accordance with the framing procedure RT1 shown in FIG. 10.

Namely, when pressing the button of the mouse 13 with the cursor 70 conformed to the level corresponding to any clip in the clip information display part 32 of the main screen 30, the CPU 20 starts this framing procedure RT1 at the step SP1 and recognizes the clip specified at the subsequent step SP2.

Next, the CPU 20 proceeds to the step SP3 and judges on the basis of the data base of related data of each clip stored in the ROM 21 (FIG. 2) whether or not the video information and audio information of the relevant clip are linked and registered.

And, when getting the affirmative result at this step SP3, the CPU 20 proceeds to the step SP4, displays a shadow 71A or 71B of the length corresponding to the material length of the image or sound of the corresponding clip with the front end of the cursor 70 at that time as its head on the first or second video track 35C or 35E or on the first or second audio track 35G or 35H when the cursor 70 is moved onto the first or second video track 35C or 35E or onto the first or second audio track 35G or 35H of the screen 30. Moreover, the CPU 20 moves these two shadows 71A and 71B onto the first or second video track 35C or 35E and onto the first or second audio track 35G or 35H in response to the movement of the cursor 70.

Furthermore, the CPU 20 proceeds to the step SP5 to judge whether the button of the mouse 13 is released or not. The CPU 20 returns to the step SP4 if the negative result is obtained. On the other hand, the CPU 20 proceeds to the step SP6 if the affirmative result is obtained, then displays the frame 60A to 60D and 61A to 61D of the same length as that of the shadows 71A and 71B displayed respectively on the first or second video track 35C or 35E and on the first or second audio track 35G or 35H at the same positions as those of the shadows 71A and 71B, respectively, and proceeds to the step SP7 to terminate this framing procedure RT1.

In contrast, when obtaining the negative result at the step SP3, the CPU 20 proceeds to the step SP8 and displays the shadow 71A or 71B of the length corresponding to the material length of the corresponding clip with the front end of the cursor 70 then as its head only on the first or second video track 35C or 35E or on the first or second audio track 35G or 35H, when the cursor 70 is moved onto the first or second video track 35C or 35E or onto the first or second audio track 35G or 35H, and moreover, it moves this one shadow 71A or 71B in response to the movement of the cursor 70 on the corresponding first or second video track 35C or 35E or on the corresponding first or second audio track 35G or 35H.

Furthermore, the CPU 20 proceeds to the step SP9 to judge whether the button of the mouse 13 is released or not.

The CPU 20 returns to the step SP8 if the negative result is obtained. On the other hand, the CPU 20 proceeds to the step SP10 if the affirmative result is obtained, then displays a frame 60A to 60D and 61A to 61D of the same length as that of the shadow 71A or 71B displayed on the first or second video track 35C or 35E or on the first or second audio track 35G or 35H at the same positions as that of the relevant shadow 71A or 71B, and thereafter proceeds to the step SP7 to terminate this framing procedure RT1.

Figure 11:
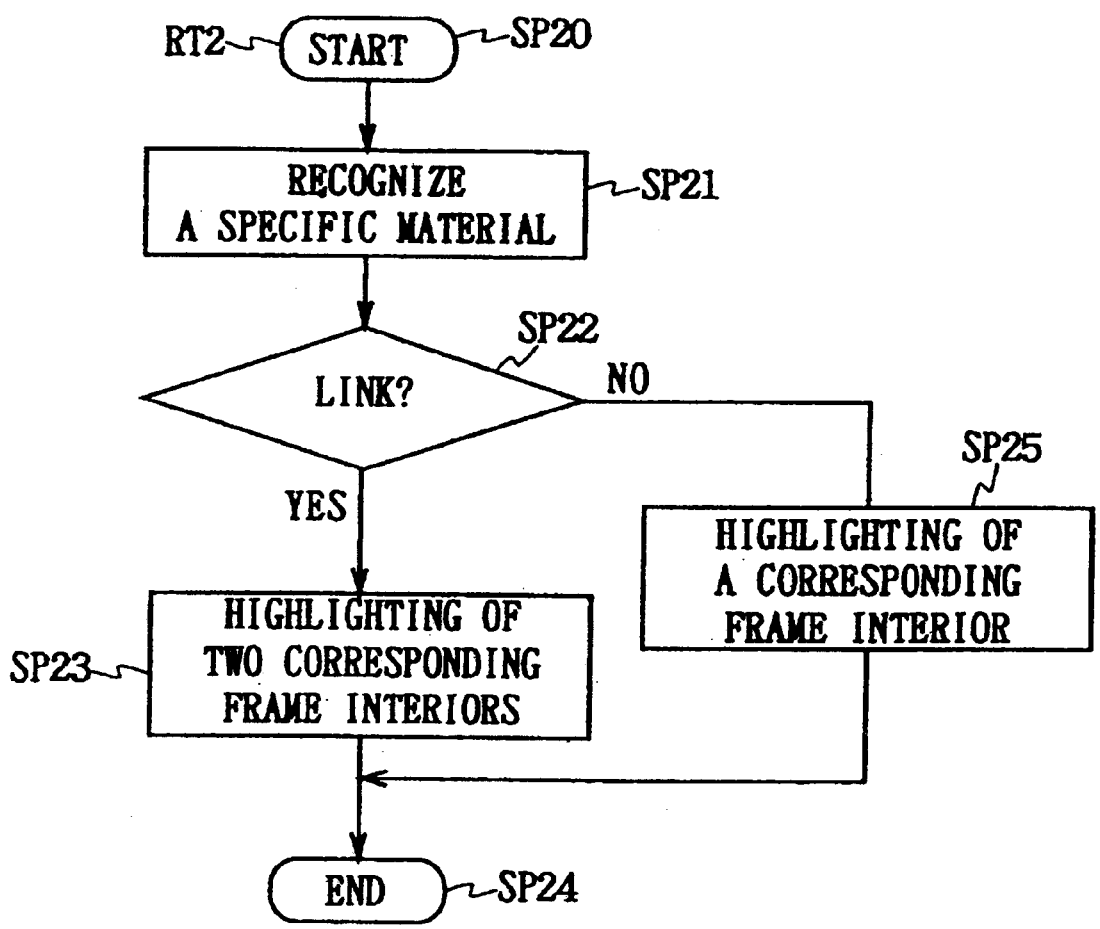
FIG. 11 is a flow chart showing the highlighting procedure.

On the other hand, when any of the frames 60A to 60D and 61A to 61D displayed on the first or second video track 35C or 3SE or on the first or second audio track 35G or 35H of the main screen 30 is clicked, the CPU 20 starts the highlighting procedure RT2 shown in FIG. 11 at the step SP20 and judges at the subsequent step SP21 based on the database of related data of each click stored in the ROM 21 (FIG. 2) whether the image and sound of the clip corresponding to a specified frame 60A to 60D or 61A to 61D are linked or unlinked to be registered.

And, when obtaining the affirmative result at the step SP22, the CPU 20 proceeds to the step SP23 to emphasize the inside of the frames 61A to 61D and 60A to 60D displayed on the first or second audio track 35G or 35H and on the first or second video track 35C or 35E corresponding to the above frames 60A to 60D and 61A to 61D by highlighting and thereafter, proceeds to the step SP24 to terminate this highlighting procedure RT2.

In contrast, when obtaining the negative result at the step SP22, the CPU 20 proceeds to the step SP25 to emphasize only the inside of the relevant frame 60A to 60D or 61A to 61D by highlighting and thereafter proceeds to the step SP24 to terminate this highlighting procedure RT2.

(5) Continuous Control Processing

Figure 12:
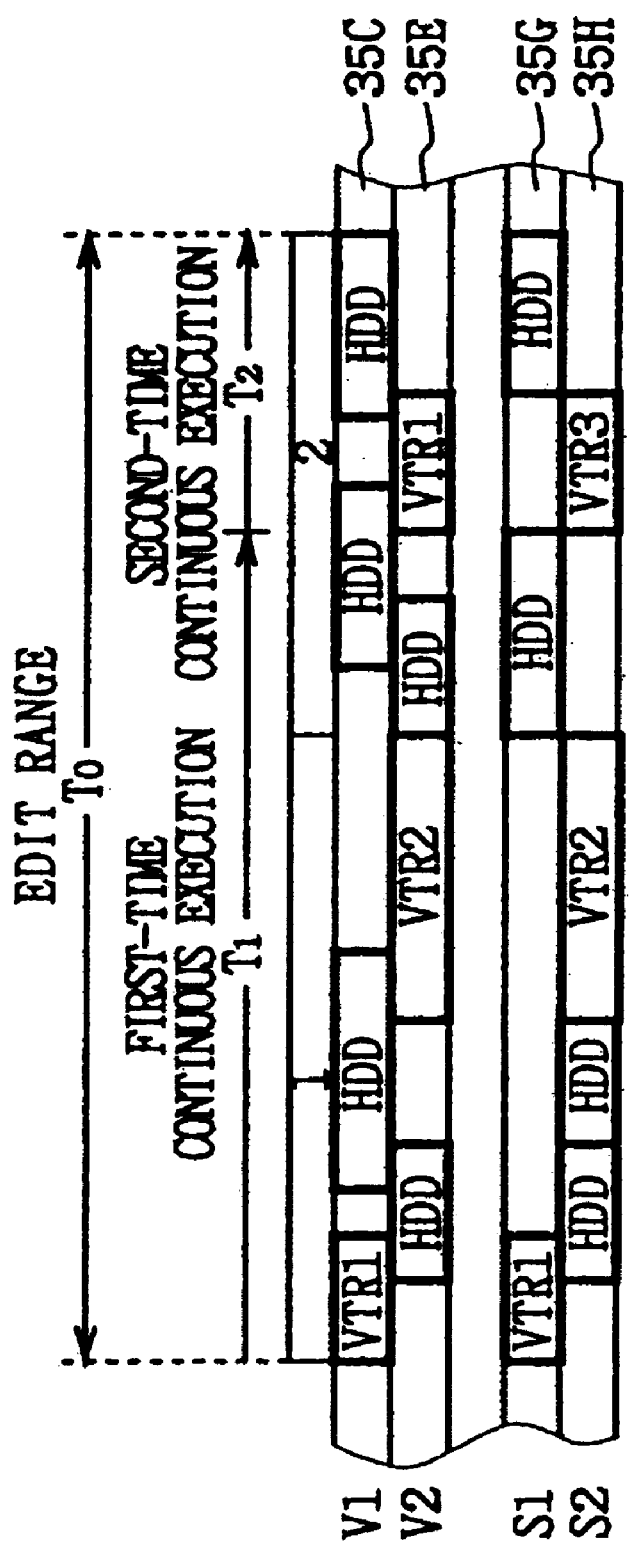
FIG. 12 is a schematic chart serving for the illustration of a continuous control procedure.

On the other hand, the CPU 20, at the preview mode or the recording mode, is arranged so as to successively play back the video signals and/or audio signals of the required clips by continuously controlling individual video tape recorders 14A to 14D and the hard disk drive 2 in succession for a period (period $T_1$) till the clip to be played back by the same video tape recorder 14A to 14D within the edit range $T_0$ to be previewed or to be record-processed as shown in FIG. 12 based on the edited list which is created or is in the middle of creation by using the edited-list creating part 35 of the main screen 30.

Besides, after continuously playing back the video signals and/or audio signals of the required clips in succession like this, the CPU 20 is arranged so as to successively play back the video signals and/or audio signals of the required clips by continuously controlling individual video tape recorders 14A to 14D and the hard disk drive 2 in succession till the clip to be played back by the same video tape recorder 14A to 14D appears within the rest edit period (period $T_2$) and thereafter successively repeat a similar processing.

Like this, this editing apparatus 1 is arranged so as to successively repeat a processing of continuously controlling individual video tape recorders 14A to 14D and the hard disk drive 2 in succession according to the need till the clip to be played back by the same video tape recorder 14A to 14D appears based on an edited list at the preview mode or the recording mode. Thus, the editing apparatus 1 can perform the playback processing till the clip to be played back by the same video tape recorder 14A to 14D appears in a real time.

Figure 13:
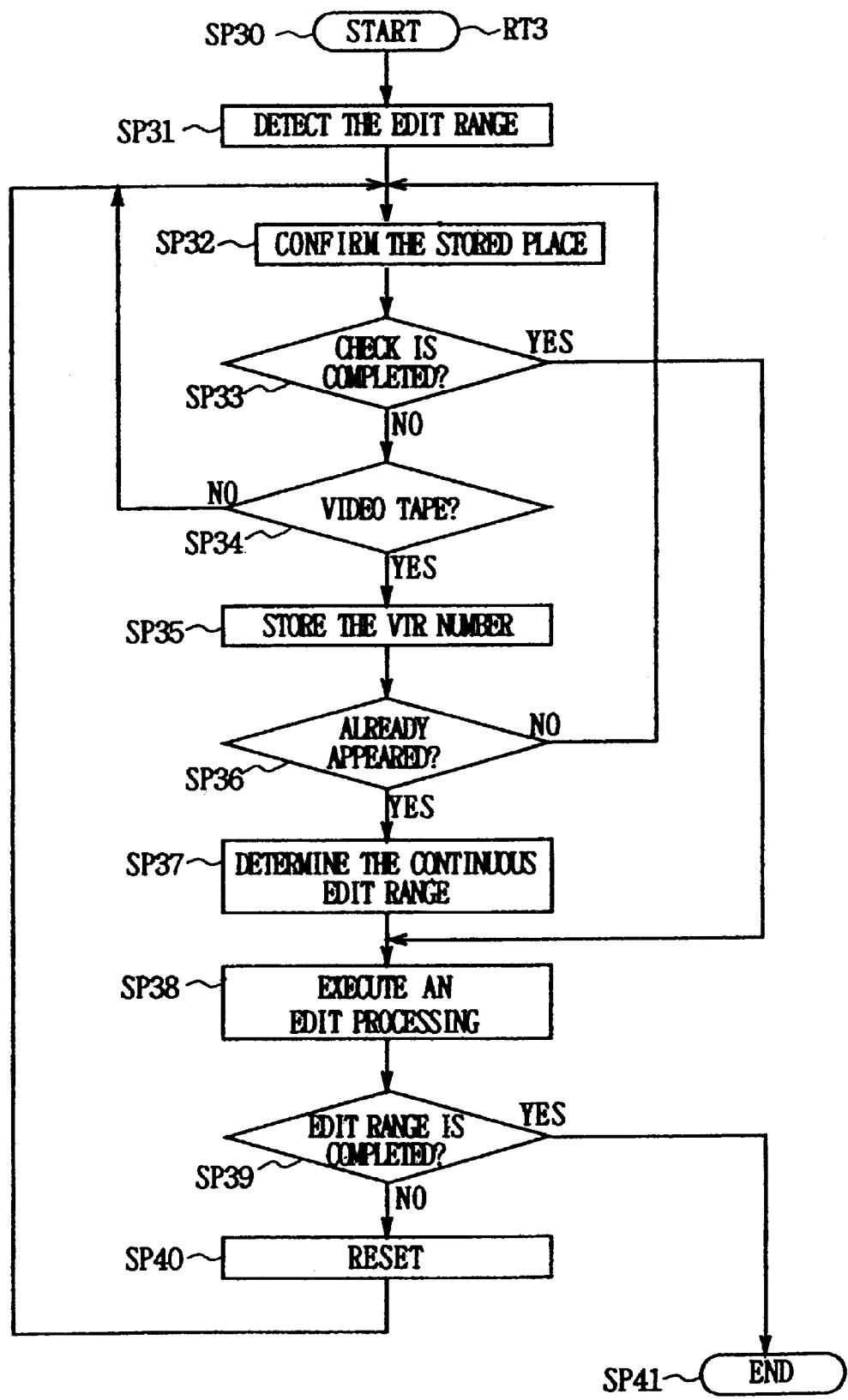
FIG. 13 is a flow chart showing a continuous control procedure.

Here, actually, the CPU 20 controls individual video tape recorders 14A to 14D and the hard disk drive 2 in the continuous control procedure RT3 shown in FIG. 13 at the preview mode and the recording mode.

Namely, when the preview button 33D or the recording button 33G displayed at the middle of the main screen 30 is clicked through a mouse manipulation during the process or at the completion of creating an edited list, the CPU 20 starts the continuous control procedure RT3 of FIG. 13 at the step SP30 and detects the edit range $T_0$ (FIG. 12) to be previewprocessed or recording-processed on the time scale 35A based on the edited list at the subsequent step SP31.

Next, the CPU 20 proceeds to the step SP32 to confirm the stored place (in a video tape recorder or the hard disk drive 2) of the video signal and/or audio signal of the clip with the smallest time cord value of the front end on the time scale 35A of the corresponding frame 60A to 60D, 61A to 61D out of individual clips within the edit range $T_0$, based on the edited list and the data base of related data of individual clips stored in the RAM 22, and judges whether the stored places for all clips within the edit range $T_0$ were confirmed or not at the step SP33.

If the affirmative result is obtained at the step SP33, the CPU 20 proceeds to the step SP38, or proceeds to the step SP34 if the negative result is obtained to judge whether the video signal and/or audio signal of the relevant clip is stored on the video tape loaded in any video tape recorder 14A to 14D or not.

And if the negative result is obtained at this step SP34, the CPU 20 returns to the step SP32 and thereafter repeats the loop of steps SP32–SP33–SP34–SP32 while changing the clip to be confirmed from the minimum time cord of the front end of the corresponding frame 60A to 60D, 61A to 61D for the clip to be confirmed in sequence at the step SP32 till the affirmative result is obtained at the step SP33 or the step SP34.

And before long if the affirmative result is obtained at the step SP34, the CPU 20 proceeds to the step SP35 to store the number of the video tape recorder 14A to 14D in which the video tape with the video signal and/or audio signal of the relevant clip stored is loaded and thereafter, proceeds to the step SP36 to judge whether the relevant number has appeared by then.

Obtaining the negative result at the step SP36 means that there is no same clip played back by a video tape recorder 14A to 14D as the relevant clip among the clips played back earlier than the relevant clip at the preview mode or the recording mode, and at this time the CPU 20 returns to the step SP32, then repeats the loop of step SP32 to step SP36 as with the above case.

In contrast, obtaining the affirmative result at the step SP36 means that there is the same clip played back by a video tape recorder 14A to 14D as the relevant clip among the clips played back earlier than the relevant clip at the preview mode or the recording mode, and at this time the CPU 20 proceeds to the step SP37 to determine the continuous edit range (periods $T_1$ and $T_2$ in FIG. 12) so as to continuously play back the clips of the range extending from the first clip to the last.

And thereafter, the CPU 20 proceeds to the step SP38 and sets the video tape to the head of the video signals and/or audio signals of the respective clips corresponding to them by controlling individual corresponding video tape recorders 14A to 14D and the hard disk drive 2.

Besides, by controlling the corresponding video tape recorders 14A to 14D, the video input section 5, the video output section 6, the digital video and audio input/output section 7, the video special-effect processing section 8, the audio input/output and mixer section 9 and/or the disk control section 10, if necessary, at a predetermined timing via the system control section 4, the CPU 20, for the continuous edit range determined at the step SP37, displays the edited image based on the edited list on the display 16 and gives the edited sound from the speaker at the preview mode, and on the other hand, records the edited image and sound into a video tape via the corresponding video tape recorder 14A to 14D as well as the recording mode.

And, before long when this preview processing or recording processing terminates, the CPU 20 proceeds to the step SP39 and judges whether all clips within the edit range $T_0$ detected at the step SP31 were submitted to a preview or recording processing.

If the negative result is obtained at this step SP39, the CPU 20 proceeds to the step SP40 to reset the numbers of individual video tape recorder 14A to 14D, stored at the step SP35, then returns to the step SP31 to restart the confirmation of the stored position of the video signal and/or audio signal of each clip from the last clip continuously edit-processed at the step SP38 and thereafter repeats the loop of step SP32 to step SP40 as with the above case to successively perform a processing.

Furthermore, before long when the affirmative result is obtained at the step SP39, the CPU 20 proceeds to the step SP41 to terminate this continuous control procedure RT3.

(6) Continuous Edit Processing

Figure 14:
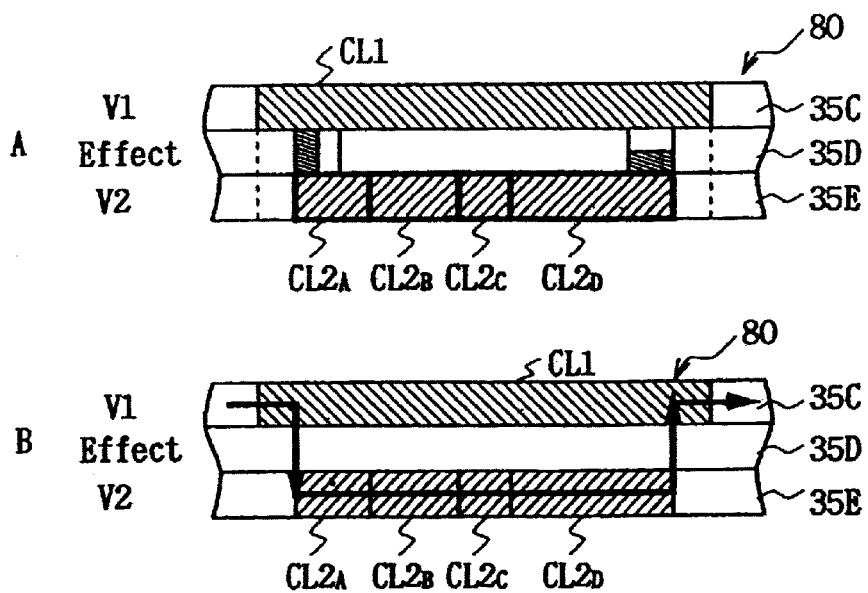
FIGS. 14A and 14B are schematic charts serving for the illustration of a longer clip and a plurality of shorter clips inclusively related to it.

On the contrary, for example, as shown in FIG. 14A, in the case of edit-processing a plurality of continuous clips (hereinafter, referred to as shorter clips) $CL2_A$ to $CL2_D$ without directive of effect, shorter in material length than a clip (hereinafter, referred to as a longer clip) CL1, respectively in accordance with the edited list 80 to be edit-processed within the edit processing period of time of the longer clip CL1 at the preview mode and recording mode, the CPU 20 continuously performs the edit-process on the individual shorter clips $CL2_A$ to $CL2_D$ after switching from the edit processing of the longer clip CL1 to the edit processing of the first shorter clip $CL2_A$, till the directive of the next effect is given (i.e., till the completion of the last shorter clip $CL2_D$).

Actually, in accordance with an edited list 80 as shown in FIG. 14A, the CPU 20 plays back a longer clip CL1 first of all by controlling a first video tape recorder 14A to 14D or the hard disk drive 2 to play back the longer CL1 via the system control section 4 and on the other hand, set the video tape to the head of the video signal of each shorter clip $CL2_A$ to $CL2_D$ by controlling a second tape recorder 14A to 14D or the hard disk drive 2 to play back each shorter clip $CL2_A$ to $CL2_D$ in a relationship of its edit processing time being overlapped on and included in that of the longer clip CL1 (hereinafter, referred to as an inclusive relationship) via the system control section 4.

Besides, at this time, the CPU 20 selects the signal line corresponding to the longer clip CL1 by controlling a switcher (not shown) in the video special-effect processing section 8 via the system control section 4.

As a result, the video signal of the longer clip CL1 played back with the first video tape recorder 14A to 14D or the hard disk drive 2 is given to the video special-effect processing section 8 via the video input section 5, the digital video and audio input/output section 7 or the disk control section 10, taken into the video special-effect processing section 8 to be submitted to a special-effect processing if necessary and thereafter, the obtained digital edited video signal S8 is sent as an edited video signal S9 to the monitor 16 or to a third recording video tape recorder 14A to 14D via the video output section 6. Furthermore, if the operating mode at this time is the recording mode, the CPU 20 starts the record processing by controlling the third video tape recorder 14A to 14D via the system control section 4 and thus records this edited video signal S9 on a video tape.

On the other hand, at the time of switching from the edit processing of the longer clip CL1 to that of the first shorter clip $CL2_A$, the CPU 20 plays back the video signal of the first shorter clip $CL2_A$ by controlling the corresponding second video tape recorder 14A to 14D via the system control section 4, and on the other hand, selects the signal line corresponding to the relevant shorter clip $CL2_A$ by controlling the switcher in the video special-effect processing section 8 via the system control section 4.

As a result, the video signal of the first shorter clip $CL2_A$ played back with this second video tape recorder 14A to 14D or the hard disk drive 2 is given to the video special-effect processing section 8 via the video input section 5, the digital video and audio input/output section 7 or the disk control section 10, taken into the video special-effect processing section 8 to be submitted to a special-effect processing in accordance with the edited list 80 and thereafter, the obtained digital edited video signal S8 is sent as an edited video signal S9 to the monitor 16 and/or to the third recording video tape recorder 14A to 14D via the video output section 6.

Furthermore, at the time of switching from the edit processing of the first shorter clip $CL2_A$. to that of other subsequent shorter clips $CL2_B$ to $CL2_D$, the CPU 20 successively plays back the video signal of the other corresponding shorter clips $CL2_B$ to $CL2_D$ at a predetermined timing by controlling the corresponding second video tape recorders 14A to 14D via the system control section 4 based on the edited list 80, and on the other hand, selects the signal line corresponding to these other shorter clips $CL2_B$ to $CL2_D$ by controlling the switcher in the video special-effect processing section 8 via the system control section 4.

As a result, the video signals of other individual shorter clips $CL2_B$ to $CL2_D$ are continuously played back with these second video tape recorders 14A to 14D or the hard disk drive 2, these video signals are successively taken into the video special-effect processing section 8 via the video input section 5, the digital video and audio input/output section 7 or the disk control section 10 and cut/connected, then sent as an edited video signal S9 to the monitor 16 and/or to the third recording video tape recorder 14A to 14D via the video output section 6. Incidentally, in this case, if submitting the first shorter clip $CL2_A$ to the special-effect processing of filial screen display such as picture-in-picture, the video special-effect processing section 8 executes a special-effect processing of cut/connection to the video signals of individual shorter clips $CL2_B$ to $CL2_D$ subsequent to this in the filial screen.

Furthermore, at the time of switchover from the edit processing of this last shorter clip $CL2_D$ to that of the longer clip CL1, the CPU 20 selects the signal line to the relevant last shorter clip $CL2_D$ by controlling the switcher in the video special-effect processing section 8 via the system control section 4.

As a result, the video signals of the longer clip CL1 being played back with the first video tape recorders 14A to 14D or the hard disk drive 2 are taken into the video special-effect processing section 8, and submitted to a specified given special-effect processing, and thereafter the obtained digital edited video signal S8 is sent as an edited video signal S9 to the monitor 16 and/or the recording third video tape recorder 14A to 14D via the video output section 6.

In this manner, the CPU 20 executes an edit processing based on the edited list 80 as shown in FIG. 14A.

Figure 15:
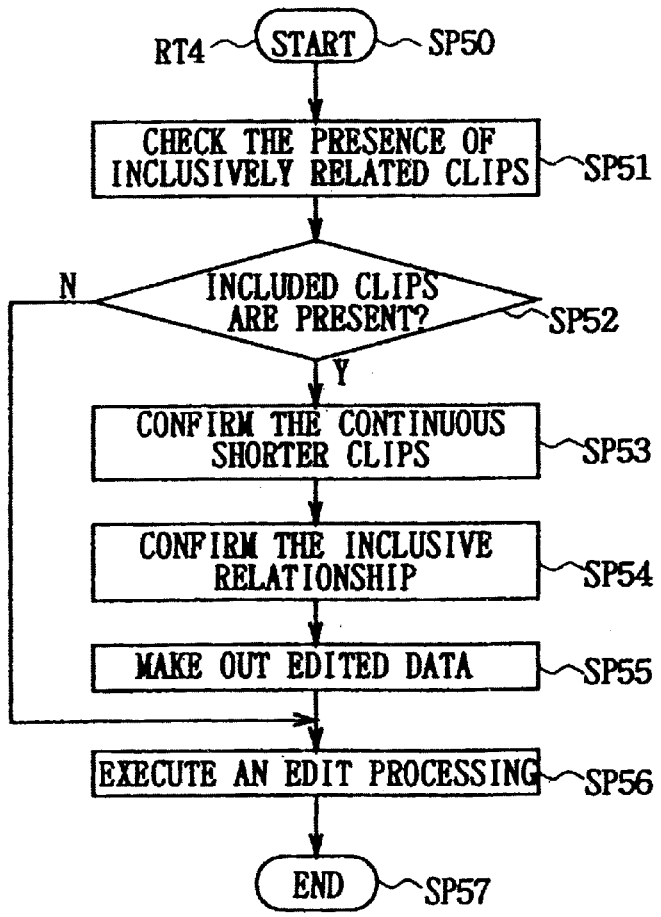
FIG. 15 is a flow chart showing a continuous editing procedure.
Figure 16:
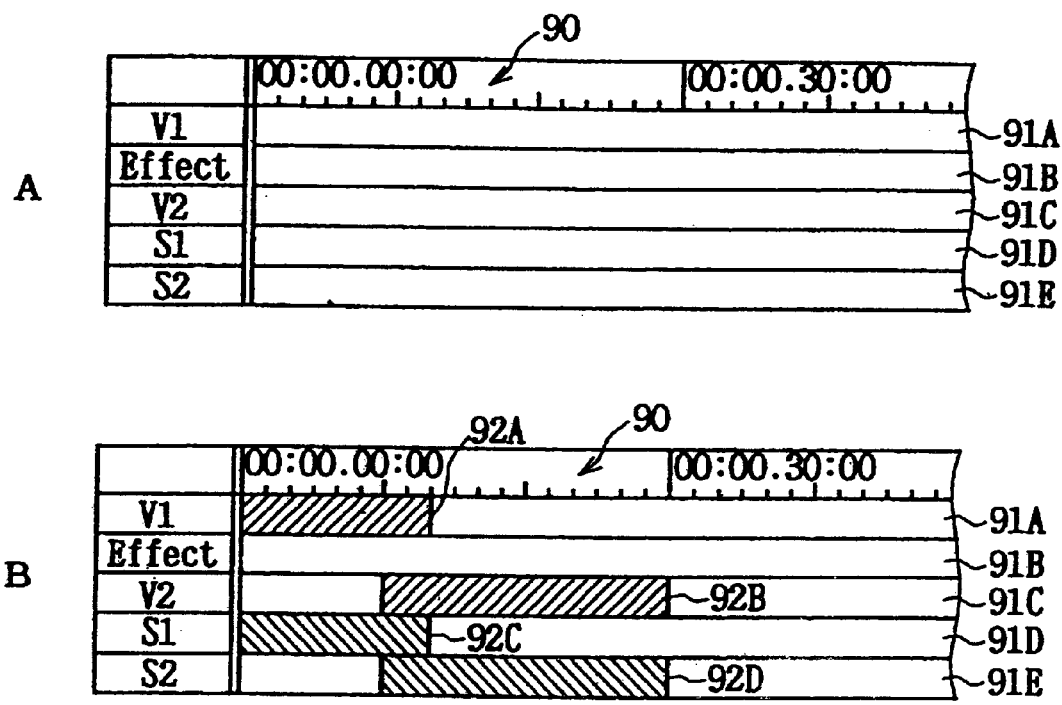
FIGS. 16A to 16B are schematic charts serving for the illustration of a GUI screen of a conventional editing apparatus.
Figure 17:
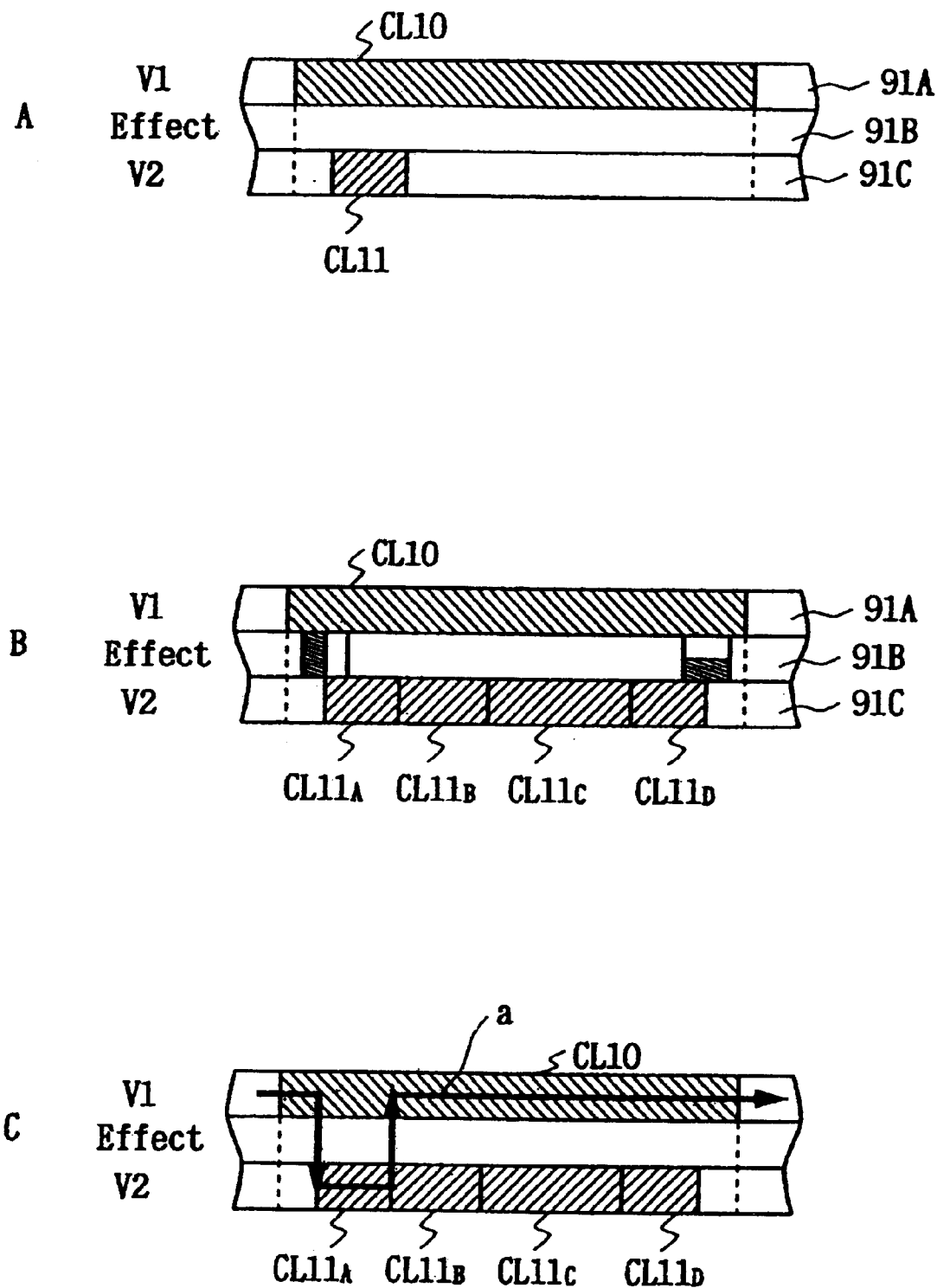
FIGS. 17A to 17C are schematic charts serving for the illustration of the edit processing of a conventional editing apparatus.

Here, actually, at the time of the preview mode and recording mode, the CPU 20 executes an edit processing in accordance with the continuous editing procedure RT4 shown in FIG. 15.

Namely, when the preview mode or the recording mode is selected by clicking the preview button 33D or the recording button 33G in the main screen 30, the CPU 20 starts this continuous editing procedure RT4 at the step SP50 and checks for the presence of a longer clip CL1 and shorter clips $CL2_A$ to $CL2_D$ inclusively related on the basis of the edited list created by using the edited-list creating part 35 of the main screen 30 at the subsequent step SP51.

And at the subsequent step SP52, the CPU 20 judges on the basis of the check result at the step SP51 whether or not there is a set of the longer clip CL1 and shorter clips $CL2_A$ to $CL2_D$ inclusively related. The CPU 20 proceeds to the step SP56 if the negative result is obtained. On the other hand, the CPU 20 proceeds to the step SP53 if the affirmative result is obtained, and confirms the continuity of the corresponding clips $CL2_A$ to $CL2_D$ (how many shorter clips $CL2_A$ to $CL2_D$ are continuous without directive of effect) and the positions of the continuous shorter clips $CL2_A$ to $CL2_D$ on the time scale 35A (a time code of the front end of the first shorter clip $CL2_A$ and a time code of the rear end of the last shorter clip $CL2_D$ in the continuous shorter clips $CL2_A$ to $CL2_D$). Incidentally, at this time, if there are a plurality of sets of longer clip CL1 and shorter clips $CL2_A$ to $CL2_D$ inclusive related, the CPU 20 confirms the 4 positions of the continuous shorter clips $CL2_A$ to $CL2_D$ on the time scale 35A for the respective sets.

Next, the CPU 20 proceeds to the step SP54 and confirms on which the first and second video tracks 35C, 35E of the edited-list creating part 35 of the main screen 30 individual frames 60A to 60D corresponding respectively to the longer clip CL1 and individual shorter clips $CL2_A$ to $CL2_D$ are displayed.

Furthermore, thereafter the CPU 20 proceeds to the step SP55 and creates such edited data as to continuously perform an edit processing on individual shorter clips $CL2_A$ to $CL2_D$ from the first to the last, for any of longer clip CL1 and individual continuous shorter clips $CL2_A$ to $CL2_D$ inclusively related to it.

And, the CPU 20 proceeds to the step SP56 to execute an edit processing by controlling a video tape recorder 14A to 14D, the video input section 5, the video output section 6, the digital video and audio input/output section 7, the video special-effect processing section 8, the audio input/output and mixer section 9, the disk control section 10 and the hard disk drive 2 based on the above edited data at a predetermined timing according to necessity, then proceeds to the step SP57 to terminate this continuous editing procedure RT4.

(7) Operations and Advantages of This Embodiment (7-1) Operations and Advantages of Framing Processing and Highlighting Processing With the above configuration, when the cursor is moved onto the first or second video track 35C or 35E or onto the first or second audio track 35G or 35H after one clip in the clip list display part 32 of the main screen 30 is specified at the time of creating an edited list, this editing apparatus 1 displays a shadow 71A or 71B on the first or second video track 35C or 35E or on the first or second audio track 35G or 35H specified by the cursor 70.

Accordingly, at the time of creating an edited list, this editing apparatus 1 can assure the display state of the frame 60A to 60D or 61A to 61D corresponding to a specified clip in advance on the basis of a shadow 71A or 71B displayed on the first or second video track 35C or 35E or on the first or second audio track 35G or 35H, thereby enabling the operation of creating an edited list to be simplified by such an extent.

Besides, when any of the frames 60A to 60D and 61A to 61D displayed on the first or second video track 35C or 35E or on the first or second audio track 35G or 35H of the main screen 30 is clicked, this editing apparatus 1 emphasizes only the inside of the relevant frame 60A to 60D or 61A to 61D by highlighting if the video information and the audio information of the corresponding clip are unlinked and registered.

And, if the video information and the audio information of the corresponding clip are linked and registered, the editing apparatus 1 emphasizes both the inside of the relevant frame 60A to 60D or 61A to 61D and the inside of the relevant frame 60A to 60D or 61A to 61D displayed on the first or second video track 35C or 35E or on the first or second audio track 35G or 35H corresponding to it by highlighting.

Accordingly, at the time of creating an edited list, in this editing apparatus 1, it can be easily judged visually whether the video information and audio information of the clip corresponding to a specified frame 60A to 60D or 61A to 61D are linked or unlinked to be registered, based on the highlighting of frames (a frame) 60A to 60D and/or 61A to 60D displayed on the first or second video track 35C or 35E and/or on the first or second audio track 35G or 35H of the main screen 30. Therefore, the operation of creating an edited list can be simplified by such an extent.

According to the above configuration, a shadow 71A or 71B of the length corresponding to material length of a specified clip is so arranged as to be displayed with the front end of the cursor 70 set to its head on the first or second video track 35C or 35E or on the first or second audio track 35G or 35H at the time of creating an edited list, so that an operator can assure the display state of the frame 60A to 60D or 61A to 61D corresponding to a specified clip in advance on the basis of this shadow 71A or 71B. Thus, an editing apparatus capable of markedly improving the operating efficiency of creating an edited list can be implemented.

Besides, according to the above configuration, at the time of creating an edited list, if the video information and the audio information of the clip corresponding to the frame 60A to 60D or 61A to 61D to be changed in position are linked and registered which is displayed on the first or second video track 35C or 35E or on the first or second audio track 35G or 35H, the two corresponding frames 60A to 60D and 61A to 61D are highlighted. On the other hand, if the video information and the audio information of the corresponding clip are unlinked and registered, only the one corresponding frame 60A to 60D or 61A to 61D is highlighted. Thus, an operator can easily recognize whether a link is present or not between the video information and the audio information of the corresponding clip based on the highlighting, thereby enabling an editing apparatus capable of markedly improving the operating efficiency of creating an edited list to be implemented.

(7-2) Operations and Advantages of Continuous Control Processing

Further, at the preview mode and the recording mode, in the case where there is no clip to be played back by the same video tape recorder 14A to 14D within the edit range $T_0$ to be preview-processed or recording-processed based on the edited list, this editing apparatus 1 continuously plays back all clips included in the relevant edit range $T_0$ in succession by controlling continuously the corresponding 71 video tape records 14A to 14D and/or the hard disk drive 2 in succession at a predetermined timing.

In contrast, if there is a clip to be played back with the same video tape recorder 14A to 14D within the edit range $T_0$ to be preview-processed or recording-processed, the editing apparatus 1 continuously plays back these individual clips in succession by continuously controlling the video tape recorder 14A to 14D corresponding to each clip or the hard disk drive 2 during a period (period $T_1$ in FIG. 12) till the relevant clip is needed.

Besides, thereafter in a similar manner, in the case where there is a clip whose video signal and/or audio signal to be played back with the same video tape recorder 14A to 14D within the rest edit range (period $T_2$ in FIG. 12), the editing apparatus 1 continuously plays back these individual clips in succession by continuously controlling the video tape recorder 14A to 14D corresponding to each clip or the hard disk drive 2 till the playback of the relevant clip.

Thus, this editing apparatus 1 require neither rewind operation nor cue operation of the corresponding video tape recorder 14A to 14D whenever a juncture between the clips appears at the preview mode or the recording mode, and can perform a real-time playback processing during a period till the clip to be played back by the same video tape recorder 14A to 14D is needed. Thus, this editing apparatus 1 can preview an edited image and sound identical with or near to the edited result at the preview mode and can perform a recording operation more rapidly at the recording mode. According to the above embodiment, individual clips continuing till a clip to be played back with the same video tape recorder 14A to 14D appears within the edit range $T_0$ to be preview-processed or to be recording-processed are continuously played back in succession at the preview mode or the recording mode based on the edited list with individual video tape recorders 14A to 14D corresponding to these clips and/or the hard disk drive 2 continuously being controlled, so that a playback processing can be accomplished in a real time during a period till a clip to be played back with the same video tape recorder 14A to 14D appears, thus an editing apparatus capable of markedly improving the operating efficiency of an editing operation can be implemented.

(7-3) Operations and Advantages of Continuous Editing Processing

Further, at the preview mode and the recording mode, if a longer clip CL1 and shorter clips $CL2_A$ to $CL2_D$ inclusively related are not present on the basis of the edited list, this editing apparatus 1 executes an edit processing as it is based on the edited list. On the other hand, if the longer clip CL1 and shorter clips $CL2_A$ to $CL2_D$ inclusively related are present, the editing apparatus 1 creates such an edited data as to continuously edit-process individual continuous shorter clips $CL2_A$ to $CL2_D$ included in longer clip CL1 without directive of effect and executes an edit processing based on the edited data.

Thus, in the case of an edit that a longer clip CL1 and a plurality of shorter clips $CL2_A$ to $CL2_D$ are inclusively related, this editing apparatus 1 does not require an operator to perform an edit processing of previously merging individual shorter clips $CL2_A$ to $CL2_D$ into one clip, thereby enabling the operation of creating an edited list to be simplified by this extent.

According to this arrangement, in the case of edit-processing a longer clip CL1 and the plurality of continuous shorter clips $CL2_A$ to $CL2_D$ inclusively related to it, individual subsequent shorter clips $CL2_B$ to $CL2_D$ are continuously edit-processed after the edit processing of the first shorter clip $CL2_A$, so that the edit operation can be simplified. Thus, the operating efficiency of the edit operation can be markedly improved.

(8) Other Embodiments (8-1) Other Embodiments of Framing Processing and Highlighting Processing In the above embodiment, a description is made of a case where the CPU 20 displays the frame 60A to 60D or 61A to 61D conforming in length to a specified clip at a specified position on the first or second video track 35C or 35E or on the first or second audio track 35G or 35H of the main screen 30. However, the present invention is not limited to this, but other marks of various shapes than a frame are widely applicable.

Besides, in the above embodiment, a description is made of a case where the CPU 20 displays shadows 71A and 71B on the first and second video track 35C and 35E and on the first and second audio track 35G and 35H according to necessity. However, the present invention is not limited to this, but other marks of various shapes than shadows are widely applicable.

Furthermore, in the above embodiment, a description is made of a case where first display control means for displaying shadows 71A and 71B on the first and second video track 35C and 35E and on the first and second audio track 35G and 35H according to necessity and second display control means for displaying shadows 71A and 71B conforming in length to the material length of the corresponding clip on the first and second video track 35C and 35E and on the first and second audio track 35G and 35H according to necessity are comprised in the CPU 20 of the main control section 3 for managing the control of the whole editing apparatus 1. However, the present invention is not limited to this, but first and second display control means can be provided separately from the CPU 20.

Still further, in the above embodiment, a description is made of a case where the present invention is applied to the editing apparatus 1 composed as shown in FIG. 1. However, the present invention is not limited to this, but is applicable to other various edited-list creating apparatus, so arranged as capable of creating an edited list in such a manner that by specifying a desired position on a first track provided along the time axis after specifying a desired image/sound material out of a plurality of image/sound materials registered in advance, and thereby displaying a first mark conforming in length to the specified image/sound material at a specified position on the first track.

Yet further, in the above embodiment, a description is made of a case where if the video information and the audio information of the clip corresponding to a specified frame 60A to 60D or 61A to 61D are linked and registered which is displayed on the first or second video track 35C or 35E or on the first or second audio track 35G or 35H, the CPU 20 of the main control section 3 for managing the control of the whole editing apparatus 1 is applied as display control means for highlighting individual frames 60A to 60D and 61A to 61D displayed on the first or second video track 35C or 35E and on the first or second audio track 35G or 35H respectively. However, the present invention is not limited to this, but the display control means can be provided separately from the CPU 20.

Yet further, in the above embodiment, a description is made of a case where if the video information and the audio information of the clip corresponding to a specified frame 60A to 60D or 61A to 61D are linked and registered which is displayed on the first or second video track 35C or 35E or on the first or second audio track 35G or 35H, highlighting the inside of the frames 60A to 60D and 61A to 61D is arranged as an emphasized display method in emphasizing individual corresponding frames displayed on the first or second video track 35C or 35E and on the first or second audio track 35G or 35H respectively. However, the present invention is not limited to this, but other various methods can be widely applied for emphasized display method.

(8-2) Other Embodiments of Continuous Control Processing

Moreover, in the above embodiment, a description is made of a case where the present invention is applied to an editing apparatus 1 so configured as shown in FIG. 1. However, the present invention is not limited to this, but can be widely applied to other editing apparatuses of various configurations, so arranged as to obtain the edited image and/or sound according to the edited list, in brief, by successively playing back edit materials recorded on recording media of tape type (video tapes in this embodiment) with corresponding playback devices respectively, based on the edited list at a predetermined timing. In this case, the present invention can be applied also to an editing apparatus in which the editing materials are either of video signals or audio signals alone.

Besides, in the above embodiment, a description is made of a case where the CPU 20 for managing the control of this entire editing apparatus 1 is applied to control means for allowing individual corresponding video tape recorders 14A to 14D to continuously play back the video signals and/or audio signals of the clips by controlling the corresponding video tape recorders 14A to 14D in sequence during a period till a clip to be played back by the same video tape recorder 14A to 14D appears on the basis of the edited list in obtaining an edited image and sound. However, the present invention is not limited to this, but such control means can be provided separately from the CPU 20.

Furthermore, in the above embodiment, a description is made of a case where, in continuously playing back clips till the playback of a clip to be played back by the same video tape recorder 14A to 14B, the CPU 20 allows individual video tape recorders 14A to 14D to previously perform a cue. However, the present invention is not limited to this, but after allowing only the video tape recorder 14A to 14D playing back the first clip to perform a cue, the CPU can start the continuous control processing immediately and can allow a cur of individual subsequent clips to be performed in sequence at a necessary timing.

Still further, in the above embodiment, a description is made of a case where, with respect to all clips within the edit range $T_0$ to be preview-processed or recording-processed, video signals and/or audio signals of required clips are continuously played back in sequence by continuously controlling individual video tape recorders 14A to 14D and the hard disk drive 2 in sequence during a period till a clip to be played back by the same video tape recorder 14A to 14D appears. However, the present invention is not limited to this, but a processing similar to the above can be applied to individual ranges in which a plurality of clips to be continuously edit-processed among the edit range $T_0$ to be preview-processed or recording-processed.

(8-3) Other Embodiments of Continuous Editing Processing

Incidentally, in the above embodiment, a description is made of a case where the CPU 20 creates edited data for continuously performing an edit processing on individual shorter clips $CL2_A$ to $CL2_D$ inclusively related to any of the longer clips CL1 from the first to the last for the plurality of continuous shorter clips $CL2_A$ to $CL2_D$, before execution of edit processing based on edited list. However, the present invention is not limited to this, but such edited data can be successively made out while executing an edit processing.

Besides, in the above embodiment, a description is made of a case where, in edit-processing a plurality of continuous shorter clips $CL2_A$ to $CL2_D$ with their edit-processing periods of time included in that of the longer clip CL1 on the time scale 35A based on the edit list, the CPU 20 of the main control section 3 managing the control of this entire editing apparatus 1 is applied to edited-data creating means for creating edited data for continuously edit-processing individual second edit materials $CL2_A$ to $CL2_D$ from the first shorter clip $CL2_A$ to the last edit material $CL2_D$. However, the present invention is not limited to this, but edited data creating means can be provided separately from the CPU 20.

Furthermore, in the above embodiment, a description is made of a case where the present invention is applied to an editing apparatus with its edit materials made of image/sound materials. However, the present invention is not limited to this, but can be widely applied to an editing apparatus in which the edit materials are only either of image materials or sound materials.

Still further, in the above embodiment, a description is made of a case where, in edit-processing a plurality of continuous shorter clips $CL2_A$ to $CL2_D$ with their edit-processing periods of time included in that of the longer clip CL1 on the time scale 35A, the CPU 20 creates the edited data for continuously edit-processing individual second edit materials $CL2_A$ to $CL2_D$ from the first shorter clip $CL2_A$ to the last second edit material $CL2_D$ only for video signals of individual clips. However, the present invention is not limited to this, but such edited data can be created only for audio signals of individual clips or for both video and audio signals of individual clips.

Yet further, in the above embodiment, a description is made of a case where, in edit-processing a plurality of continuous shorter clips $CL2_A$ to $CL2_D$ with their edit-processing periods of time included in that of the longer clip CL1 on the time scale 35A, the CPU 20 determines the continuous edit-processing range of shorter clips $CL2_A$ to $CL2_D$ based on a presence or absence of an effect. However, the present invention is not limited to this, but the continuous edit-processing range can be determined to the range from the first shorter clip $CL2_A$ to the last edit material $CL2_D$ regardless of whether an effect is present or not. Even if the range is determined like this, an effect similar to that of this embodiment can be obtained.

INDUSTRIAL APPLICABILITY

An edited-list creating apparatus, an editing apparatus and an editing method, according to the present invention can be utilized for an editing apparatus for business use of a broadcasting station and the like.

What is claimed is:

1. An editing apparatus for executing an edit processing to produce a picture-in-picture clip based on an editing list wherein a plurality of continuous short clips are inclusively related to a long clip, comprising:

edited data creating means for creating edit data on the basis of said editing list, for continuously performing said edit processing on each of the continuous short clips after starting said edit processing on said long clip; and editing means for executing said edit processing on the basis of said edit data, thereby producing said picture-in-picture clip from said long clip and said plurality of continuous short clips.

2. The editing apparatus according to claim 1, wherein said edited data creating means creates preliminary edit data for continuously performing said edit processing on each of the continuous short clips before starting said edit processing on said long clip.

* * * * *